United States Patent
Badin et al.

(10) Patent No.: US 11,698,455 B2
(45) Date of Patent: *Jul. 11, 2023

(54) ICE CRYSTAL DETECTION BY WEATHER RADAR

(71) Applicant: Honeywell International Inc., Charlotte, NC (US)

(72) Inventors: Pavel Badin, Dolni Kounice (CZ); David C. Vacanti, Renton, WA (US); Jan Lukas, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 254 days.

This patent is subject to a terminal disclaimer.

(21) Appl. No.: 17/247,727

(22) Filed: Dec. 21, 2020

(65) Prior Publication Data

US 2021/0132220 A1    May 6, 2021

Related U.S. Application Data

(63) Continuation of application No. 15/913,155, filed on Mar. 6, 2018, now Pat. No. 10,877,150.

(51) Int. Cl.
*G01S 13/95* (2006.01)
*G01W 1/02* (2006.01)
(Continued)

(52) U.S. Cl.
CPC ........... *G01S 13/953* (2013.01); *G01S 7/412* (2013.01); *G01S 13/424* (2013.01); *G01S 13/95* (2013.01);
(Continued)

(58) Field of Classification Search
CPC ........ G01S 13/953; G01S 13/95; G01S 7/412; G01S 13/424; G01S 13/958; G01S 2013/0254; G01W 1/02; Y02A 90/10
See application file for complete search history.

(56) References Cited

U.S. PATENT DOCUMENTS

| | | | |
|---|---|---|---|
| 4,940,987 A | 7/1990 | Frederick | |
| 5,028,929 A * | 7/1991 | Sand | G01S 13/106 342/26 B |

(Continued)

FOREIGN PATENT DOCUMENTS

| | | |
|---|---|---|
| EP | 3070501 A1 | 9/2016 |
| JP | H0295294 A | 4/1990 |

OTHER PUBLICATIONS

Sugier et al., "Detection and removal of clutter and anaprop in radar data using a statistical scheme based on echo fluctuation," Proceedings of ERAD, Copernicus GmBH, Jan. 1, 2002, 8 pp.

(Continued)

*Primary Examiner* — Peter M Bythrow
(74) *Attorney, Agent, or Firm* — Shumaker & Sieffert, P.A.

(57) ABSTRACT

In some examples, a system includes a weather radar device configured to transmit radar signals, receive first reflected radar signals at a first time, and receive second reflected radar signals at a second time. In some examples, the system also includes processing circuitry configured to determine a first magnitude of reflectivity based on the first reflected radar signals and determine a second magnitude of reflectivity based on the second reflected radar signals. In some examples, the processing circuitry is also configured to determine a temporal variance in reflectivity magnitudes based on determining a difference in reflectivity between the first magnitude and the second magnitude. In some examples, the processing circuitry is further configured to determine a presence of ice crystals based on the first magnitude of reflectivity, the second magnitude of reflectivity, and the temporal variance in reflectivity magnitudes.

20 Claims, 13 Drawing Sheets

(51) Int. Cl.
  *G01S 7/41*   (2006.01)
  *G01S 13/42*  (2006.01)
  *G01S 13/02*  (2006.01)

(52) U.S. Cl.
  CPC ............ *G01S 13/958* (2013.01); *G01W 1/02* (2013.01); *G01S 2013/0254* (2013.01); *Y02A 90/10* (2018.01)

(56) References Cited

U.S. PATENT DOCUMENTS

| | | | |
|---|---|---|---|
| 5,202,690 | A | 4/1993 | Frederick |
| 5,500,646 | A * | 3/1996 | Zrnic .................. G01S 13/951 342/188 |
| 5,597,305 | A | 1/1997 | Ray, Sr. |
| 5,781,146 | A | 7/1998 | Frederick |
| 5,828,332 | A | 10/1998 | Frederick |
| 5,850,619 | A | 12/1998 | Rasmussen et al. |
| 5,920,276 | A | 7/1999 | Frederick |
| 6,347,767 | B1 | 2/2002 | Holmen |
| 6,377,202 | B1 | 4/2002 | Kropfli et al. |
| 6,597,305 | B2 | 7/2003 | Szeto et al. |
| 6,615,140 | B2 * | 9/2003 | White ...................... G01S 7/415 702/3 |
| 6,667,710 | B2 | 12/2003 | Cornell et al. |
| 6,690,317 | B2 | 2/2004 | Szeto et al. |
| 6,707,415 | B1 | 3/2004 | Christianson |
| 6,720,906 | B2 | 4/2004 | Szeto et al. |
| 6,741,203 | B1 | 5/2004 | Woodell |
| 6,839,018 | B2 | 1/2005 | Szeto et al. |
| 7,417,577 | B2 * | 8/2008 | Testud .................... G01S 13/95 73/170.16 |
| 7,492,304 | B1 | 2/2009 | Woodell et al. |
| 7,541,971 | B1 | 6/2009 | Woodell et al. |
| 7,982,658 | B2 | 7/2011 | Kauffman et al. |
| 8,068,050 | B2 | 11/2011 | Christianson |
| 8,111,186 | B2 | 2/2012 | Bunch et al. |
| 8,228,227 | B2 | 7/2012 | Bunch et al. |
| 8,289,202 | B1 | 10/2012 | Christianson |
| 8,659,468 | B2 | 2/2014 | Pujol et al. |
| 8,724,099 | B2 | 5/2014 | Asahara et al. |
| 9,188,700 | B2 | 11/2015 | Bunch et al. |
| 9,229,100 | B2 | 1/2016 | Lee et al. |
| 9,244,166 | B1 * | 1/2016 | Finley ................... G01S 13/953 |
| 9,507,022 | B1 | 11/2016 | Breiholz et al. |
| 9,535,158 | B1 | 1/2017 | Breiholz et al. |
| 9,612,328 | B1 | 4/2017 | Breiholz et al. |
| 9,720,082 | B1 | 8/2017 | Dana et al. |
| 9,897,695 | B2 | 2/2018 | Vacanti |
| 9,972,917 | B2 | 5/2018 | Vacanti et al. |
| 10,324,180 | B1 * | 6/2019 | Lawton ................. G01S 13/958 |
| 10,775,498 | B2 | 9/2020 | Vacanti |
| 2010/0245167 | A1 | 9/2010 | Bunch et al. |
| 2011/0148694 | A1 | 6/2011 | Bunch et al. |
| 2011/0187588 | A1 | 8/2011 | Khatwa et al. |
| 2012/0133551 | A1 * | 5/2012 | Pujol .................... G01S 13/958 342/26 R |
| 2012/0139778 | A1 | 6/2012 | Bunch et al. |
| 2013/0008174 | A1 | 1/2013 | Gould et al. |
| 2013/0234884 | A1 * | 9/2013 | Bunch ................... G01S 13/953 342/26 B |
| 2014/0210661 | A1 * | 7/2014 | Balaji .................... G01S 13/95 342/174 |
| 2015/0073710 | A1 | 3/2015 | Deierling et al. |
| 2015/0304813 | A1 | 10/2015 | Esposito et al. |
| 2016/0011334 | A1 | 1/2016 | Khatwa et al. |
| 2016/0011839 | A1 | 1/2016 | Khatwa et al. |
| 2016/0033641 | A1 | 2/2016 | Bunch et al. |
| 2016/0131758 | A1 * | 5/2016 | Christianson ........... G01S 13/95 342/26 R |
| 2016/0252614 | A1 * | 9/2016 | Takechi .................. G01S 13/95 342/26 R |
| 2016/0274271 | A1 * | 9/2016 | Lukas ..................... G01W 1/02 |
| 2017/0082745 | A1 * | 3/2017 | Kronfeld ............... G01S 13/953 |
| 2017/0104276 | A1 | 4/2017 | Vacanti et al. |
| 2017/0160389 | A1 | 6/2017 | Vacanti |
| 2018/0149745 | A1 * | 5/2018 | Christianson ........... G01S 7/062 |
| 2019/0113618 | A1 | 4/2019 | Lukas et al. |
| 2019/0277964 | A1 | 9/2019 | Badin et al. |

OTHER PUBLICATIONS

Extended Search Report from counterpart European Application No. 19160658.1, dated Aug. 1, 2019, 14 pp.

Response to Extended Search Report dated Aug. 1, 2019, from counterpart European Application No. 19160658.1, filed Feb. 21, 2020, 29 pp.

"NASA Goes Down Under to Tap High-Altitude Ice," NASA News, retrieved Jul. 8, 2014 from http://www.nasa.gov/aero/haic_camaign.htmi.U7wsHPidUjQ, 3 pp.

Boudala, et al., "Ice water content and precipitation rate as a function of equivalent radar reflectivity and temperature based on in situ observations," Dec. 2006, Journal of Geophysical Research, vol. 111, 13 pp.

Heymsfield, et al., "Improved Radar Ice Water Content Retrieval Algorithms Using Coincident Microphysical and Radar Measurements," Sep. 2005, American Meteorological Society, vol. 44, pp. 1391-1412.

Heymsfield, et al., "Testing IWC Retrieval Methods Using Radar and Ancillary Measurements with In Situ Data," Jan. 2008, American Meteorological Society, vol. 47, pp. 135-163.

Mason, et al., "The Ice Particle Threat to Engines in Flight," Jan. 2006, 44th AIAA Aerospace Sciences Meeting and Exhibit, AIAA 2006-206, 21 pp.

Noel, V. et al., "Classification of ice crystal shapes in mid latitude ice clouds from three years of lidar observations over the SIRTA observatory," Journal of Atmospheric Sciences 63, hal-00115274, version 1-20, Nov. 2006, pp. 978-2991.

Sayres, et al., "Validation and Determination of ice water content-radar reflectivity relationships during CRYSTAL-FACE: Flight requirements for future comparisons," Journal of Geophysical Research, vol. 113, Mar. 6, 2008, 10 pp.

Hogan et al., "The Retrieval of Ice Water Content from Radar Reflectivity Factor and Temperature and Its Use in Evaluating a Mesoscale Model", American Meteorological Society, Journal of Applied Meteorology and Climatology, vol. 45, Jun. 2005, pp. 301-317.

Pokharel et al., "Evaluation of Collated Measurements of Radar Reflectivity of Particle Sizes in Ice Clouds", Journal of Applied Metrology and Climatology, Apr. 2011, vol. 50, pp. 2104-2119.

Prosecution History from U.S. Appl. No. 15/913,155, dated Apr. 24, 2020 through Nov. 24, 2020, 48 pp.

Response to Examination Report dated Feb. 16, 2021, from counterpart European Application No. 19160658.1, filed Jun. 8, 2021, 44 pp.

Examination Report from counterpart European Application No. 19160658.1, dated Feb. 16, 2021, 4 pp.

* cited by examiner

COLORADO
(CONTINENTAL)
ANVIL

FLORIDA
(OCEANIC ABOVE CONTINENT)
ANVIL

SPHERICAL SHAPE OF ICE
CRYSTALS –
RADAR MEASUREMENT 1

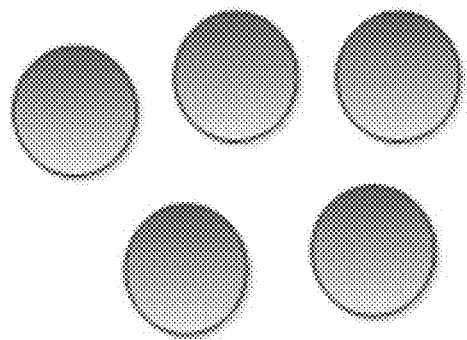

FIG. 4E

SPHERICAL SHAPE OF ICE
CRYSTALS –
RADAR MEASUREMENT 2

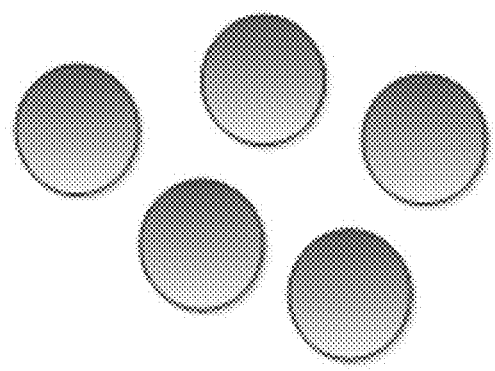

FIG. 4F

ELLIPTICAL SHAPE OF ICE
CRYSTALS –
RADAR MEASUREMENT 1

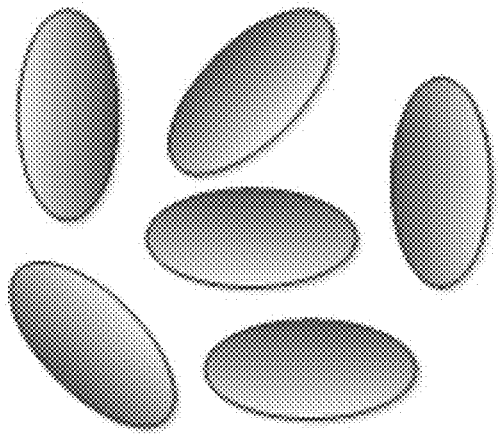

RATIO OF HORIZONTALLY AND
VERTICALLY ORIENTED ICE
CRYSTALS IS EQUAL

FIG. 4G

ELLIPTICAL SHAPE OF ICE
CRYSTALS –
RADAR MEASUREMENT 2

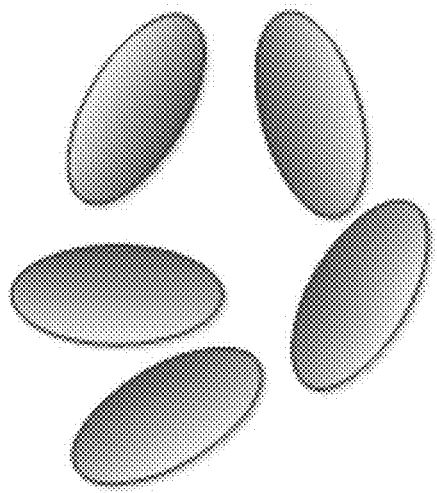

NUMBER OF VERTICALLY
ORIENTED ICE CRYSTALS IS
GREATER THAN NUMBER OF
HORIZONTALLY ORIENTED ICE
CRYSTALS

FIG. 4H

ICE CRYSTAL DETECTION BY WEATHER RADAR

The present application is a continuation of U.S. application Ser. No. 15/913,155, filed on Mar. 6, 2018, the entirety of which is hereby incorporated by reference.

TECHNICAL FIELD

This disclosure relates to weather radar.

BACKGROUND

A weather radar device may be configured to detect the reflectivity of particles in the air, which may include water molecules. In general, liquid water droplets in the air may have higher reflectivity than water molecules that are frozen as ice crystals in the air. In some examples, partially melted snow, partially melted ice crystals, or partially frozen liquid water droplets may have higher reflectivity than completely melted liquid water droplets or completed frozen ice crystals.

If the temperature of the air near the surface of the earth is greater than the freezing temperature of water, water molecules in the air may be liquid up to an altitude known as the melting layer. At altitudes that are higher than the melting layer, water molecules in the air may be frozen as snow or ice. In some examples, there may be a range of altitudes below the melting layer at which water molecules in the air may be partially melted and/or partially frozen. This range of altitudes may be known as the bright band because of the higher reflectivity of the water molecules in the bright band.

Separate from the bright band, the melting layer may also be an important consideration for vehicles. Ice crystals may be present in the air at altitudes above the melting layer, and these ice crystals may interfere with the operation of vehicles. For example, the ice crystals at altitudes above the melting layer may disrupt the operation of aircraft engines. The ice crystals may also disrupt the operation of sensors mounted on aircraft flying above the melting layer. The liquid water present in a storm cloud may travel upwards to the melting layer, where the liquid water may freeze to form ice crystals. Therefore, higher quantities of ice crystals may exist just above the melting layer in and around storm clouds, including high altitudes in and around storm clouds, as compared to other locations above the melting layer.

SUMMARY

This disclosure is directed to systems, devices, and methods for detecting the presence of ice crystals. A weather radar device may be configured to transmit and receive radar signals at a first time and a second time. Processing circuitry may be configured to determine a first magnitude of reflectivity for the first time and a second magnitude of reflectivity for the second time. The processing circuitry may be configured to determine the presence of ice crystals based on at least two measurements of reflectivity magnitude. In some examples, the determination of the presence of ice crystals may also be based on the difference between the first magnitude of reflectivity and the second magnitude of reflectivity.

In one example, a system includes a weather radar device configured to transmit radar signals, receive first reflected radar signals at a first time, and receive second reflected radar signals at a second time. The system also includes processing circuitry configured to determine a first magnitude of reflectivity based on the first reflected radar signals and determine a second magnitude of reflectivity based on the second reflected radar signals. The processing circuitry is also configured to determine a temporal variance in reflectivity magnitudes based on determining a difference in reflectivity between the first magnitude and the second magnitude. The processing circuitry is further configured to determine a presence of ice crystals based on the first magnitude of reflectivity, the second magnitude of reflectivity, and the temporal variance in reflectivity magnitudes.

In another example, a method includes transmitting radar signals, receiving first reflected radar signals at a first time, and receiving second reflected radar signals at a second time. The method also includes determining a first magnitude of reflectivity based on the first reflected radar signals and determining a second magnitude of reflectivity based on the second reflected radar signals. The method further includes determining a temporal variance in reflectivity magnitudes based on determining a difference in reflectivity between the first magnitude and the second magnitude. The method includes determining a presence of ice crystals based on the first magnitude of reflectivity, the second magnitude of reflectivity, and the temporal variance in reflectivity magnitudes.

Another example is directed to a device including a computer-readable medium having executable instructions stored thereon, configured to be executable by one or more processors for causing the one or more processors to cause a weather radar device to transmit radar signals, receive first reflected radar signals at a first time, and receive second reflected radar signals at a second time. The executable instructions further cause the one or more processors to determine a first magnitude of reflectivity based on the first reflected radar signals and determine a second magnitude of reflectivity based on the second reflected radar signals. The executable instructions also cause the one or more processors to determine a temporal variance in reflectivity magnitudes based on determining a difference in reflectivity between the first magnitude and the second magnitude. The executable instructions cause the one or more processors to determine a presence of ice crystals based on the first magnitude of reflectivity, the second magnitude of reflectivity, and the temporal variance in reflectivity magnitudes.

The details of one or more examples are set forth in the accompanying drawings and the description below. Other features, objects, and advantages will be apparent from the description and drawings, and from the claims.

BRIEF DESCRIPTION OF DRAWINGS

FIGS. 4E-4H show examples of shapes of ice crystals across time.

DETAILED DESCRIPTION

Figure 1:
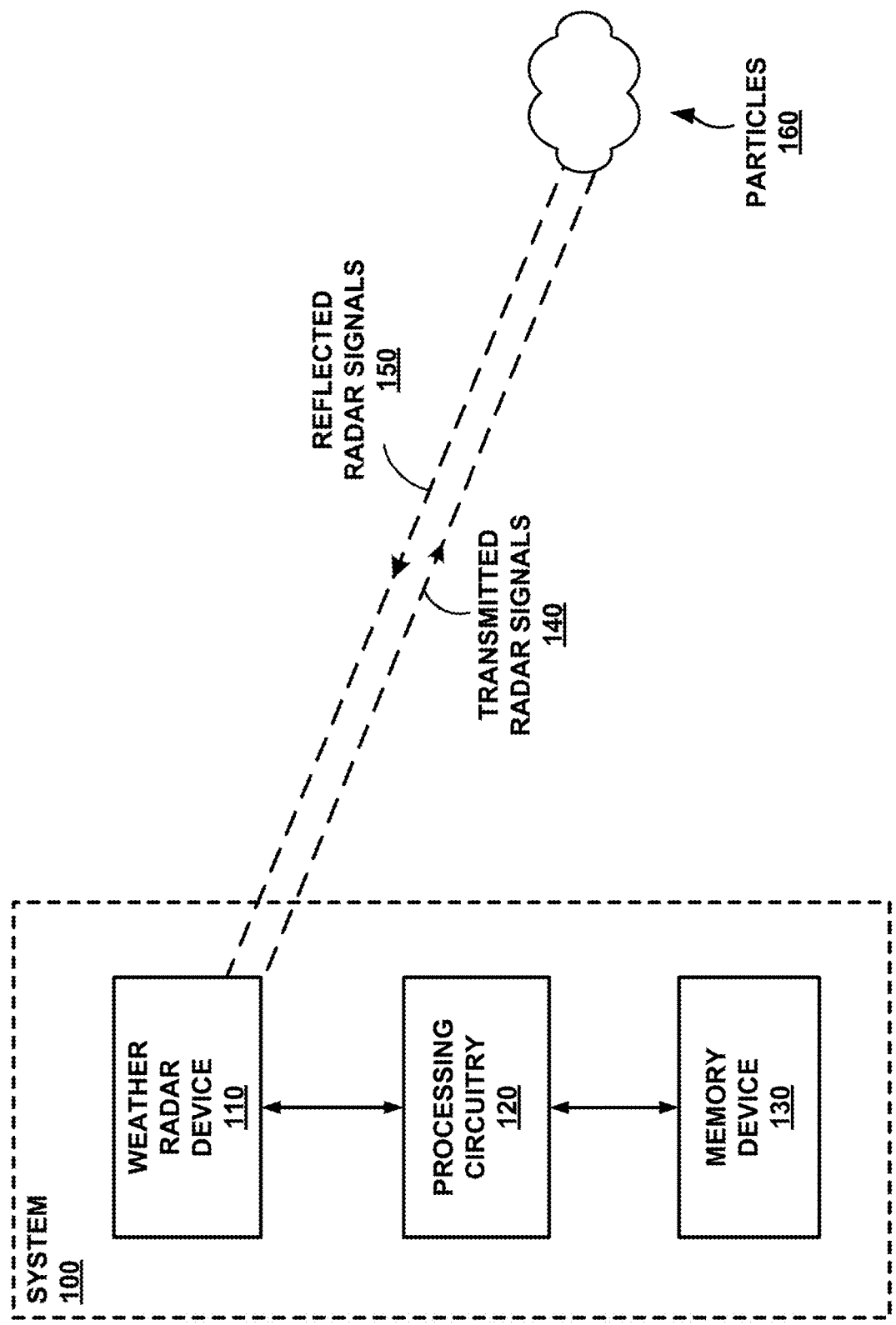
FIG. 1 is a conceptual block diagram of a system for determining the presence of ice crystals, in accordance with some examples of this disclosure.

Ice crystals may exist in the atmosphere at temperatures near and below zero degrees Celsius. Ice crystals are important for vehicle traffic because ice crystals can damage or disable engines, probes, sensors, and other devices onboard the vehicles. For example, high-performance engines may be especially vulnerable to damage caused by ice crystals. Therefore, detection of ice crystals may be valuable to avoid damage caused by operating a vehicle in an area with ice crystals.

There have been attempts to detect ice crystals directly using conventional weather radar by linking weather radar reflectivity (possibly including static air temperature) to ice crystal concentration. Unfortunately, due to varying size and shape of ice crystals, multiple independent researchers have concluded that there is no straight relationship between weather radar reflectivity and ice crystal concentration accurate enough for practically usable Ice Water Content (IWC) prediction.

Techniques using additional information to reflectivity has been proposed. For example, Lukas et al., "PREDICTION OF ICE CRYSTAL PRESENCE IN A VOLUME OF AIRSPACE," pending U.S. patent application Publication Ser. No. 14/673,524 (filed Mar. 30, 2015), which is incorporated by reference in its entirety, describes techniques using spatial reflectivity distribution in the atmosphere. Nevertheless, it would be valuable to have more straightforward method that does not require full atmospheric scan linking radar returns straightforward to ice crystal concentration. Such a method would also be much easier to validate.

Other researchers have therefore investigated dual polarization weather radar. Another additional information comes from dual-polarized radar returns. Unlike classical single-polarized aircraft weather radar, a dual-polarized radar transmits two separate signals with different polarization and estimates reflectivity for each polarization separately (typically in both vertical and horizontal direction). These estimates of reflectivity from dual-polarized radar may be more indicative of the shape of ice crystals. For example, spherical crystals should have nearly identical reflectivity in both directions while horizontally oriented "needle" ice crystals are expected to have horizontal reflectivity much bigger than vertical reflectivity.

While dual-polarized weather radar might be an answer, dual-polarized weather radar is not compatible with existing systems and might require radome changes for its installation. Dual-polarized radar is also more expensive since the processor needs to be capable of processing both polarizations simultaneously. Therefore, there is a need for a technique that could achieve similar performance with an existing type of radar.

This disclosure describes techniques for detecting the presence of ice crystals using additional information in the form of temporal variation in reflectivity magnitudes. A system may include a weather radar device configured to receive reflected radar signals at a first time and a second time. The reflected radar signals received at the first time and the second time may represent two consecutive measurements by the weather radar device. In some examples, the system may receive reflected radar signals at additional times (e.g., third, fourth, fifth, etc.). The system may also include processing circuitry configured to determine magnitudes of reflectivity based on the reflected radar signals received at the first time and the second time; in some examples, there may be additional times. The processing circuitry may be configured to determine the presence of ice crystals using the reflectivity magnitudes for the first time and the second time and their difference; in some examples, temporal variation of reflectivity magnitude estimated from more than two consecutive samples may be used, instead of just a simple difference between two measurements. For example, the processing circuitry may determine the temporal variance based on the average temporal variance between consecutive measurements for three or more measurements.

The melting layer generally refers to an altitude or altitude band in the atmosphere in which water is partially frozen or partially melted. Water at altitudes above the melting layer (e.g., zero-degree-Celsius layer) is typically in a solid form, and water at altitudes below the melting layer is typically in a liquid form. The solid water at altitudes above the melting layer may be ice crystals, snow, or hail, and the liquid water at altitudes below the melting layer may be rain. In some examples, solid water may exist at altitudes below the melting layer, and liquid water may exist at altitudes above the melting layer.

In general, liquid water may have a higher reflectivity than solid water. For example, water in liquid form may have a significantly higher radar reflectivity factor than ice crystals (e.g., up to more than five times higher). However, water in the form of ice crystals may typically have higher temporal variance in reflectivity magnitudes than liquid water. The relatively high temporal variance in reflectivity magnitudes of ice crystals may be due to the movement and shape of ice crystals in air. For example, an ice crystal may present a thin elliptical shape relative to the weather radar device at a first time and a spherical shape relative to the weather radar device at a second time. The elliptical shape may result in a lower reflectivity magnitude than the spherical shape. Thus, the temporal variance, determined, for example, based on the difference in reflectivity magnitudes, may be higher for ice crystals than for liquid water, whose shape is mainly formed by gravity. The temporal variance in reflectivity magnitudes may increase for more asymmetrical shapes of particles (e.g., thinner elliptical shapes).

Detecting the presence of ice crystals using multiple samples of reflectivity magnitudes may be especially useful for single-polarization radar devices. Dual-polarization radar devices are able to use differential reflectivity, cross-correlation, and/or specific differential phase to determine the presence of ice crystals. A single-polarization radar device may not be able to use these techniques to detect the presence of ice crystals. However, a single-polarization radar device, along with the respective processing circuitry, may be able to measure the temporal variance in reflectivity magnitudes to support the detection of the presence of ice crystals. The techniques of this disclosure may be useful for single-polarization radar devices and multiple-polarization radar devices.

Ice crystals are not necessarily stationary objects. Ice crystal events may be associated with turbulences, as observed in Mason et al., "The Ice Particle Threat to Engines in Flight," 44th AIAA Aerospace Sciences Meeting and Exhibit, which is incorporated by reference in its entirety. Therefore, ice crystals may be moving all of the time because of updrafts, downdrafts, and falling down due to gravity force. The ratio value of horizontally- and vertically-oriented ice crystals may vary in time because of the random movement due to updrafts, downdrafts, and gravity. When a radar device scans an area with spherically shaped ice crystals, the measured power of the returned signals may be the same for consequent measurements (i.e., zero or low temporal variance). However, when radar scans area with elliptically shaped ice crystals, the measured power of the returned signals may vary in time because of random orientation of ice crystals. In reality, the shape of ice crystals may be more complex than simply spheres or ellipses. A system of this disclosure may use the temporal change in reflectivity magnitude that is indicative of the shape of the ice crystals as one of the inputs for determining the presence of ice crystals because the shape may depend on geography (see, e.g., FIGS. 4A-4D) and the shape affects the reflectivity magnitude. Ice crystals may be referred to as high-altitude ice crystals (HAIC) and/or high ice water content (HIWC).

The weather radar device may be configured to use one or more simultaneous beams to determine the presence of ice crystals as an incidental part of a normal three-second volumetric scan. The weather radar device may be configured to determine the presence of ice crystals as a part of normal operation because of the one or more beams. A system of this disclosure may be configured to determine the altitude of the melting layer to search for ice crystals at altitudes above the melting layer. Depending on the phase of flight or the season of the year (locally), the melting layer may or may not be below the ownship vehicle. Thus, the weather radar device may be further configured to create one or more simultaneous beams that can see above and below flight level automatically.

A radar device can determine the presence of ice crystals with one beam. However, using multiple beams, the weather radar device may be configured to simultaneously detect of all of the weather conditions in the surveilled volume while gathering data relating to the presence, concentration, and likelihood of ice crystals. The weather radar device, especially a phased-array radar device, may be quicker and more accurate than existing mechanically scanned radar system because of the simultaneity of weather detection and melting layer detection without the need to specifically raster scan to determine the presence of ice crystals.

An existing system may conduct a raster scan using a single beam radar in order to specifically determine the presence of ice crystals. The existing mechanically scanned system includes a volumetric buffer that collects all elevation and azimuth angles, but it will take approximately thirty seconds to conduct the full scan. Using a dedicated waveform to determine the presence of ice crystals during the volumetric buffer scan would introduce additional delay. Therefore, when it takes thirty seconds to update the volumetric buffer, it is costly to conduct a search for ice crystals using dedicated waveforms. On the other hand, the one or more simultaneous beams of the active phased array weather radar device allow the data to be collected in three seconds and allowing twenty-seven seconds for more detailed studies. This twenty-seven seconds allows the weather radar device to look for ice crystals using dedicated waveforms and/or perform other functions.

Further, the phased array weather radar device can dwell in areas of potential ice crystals and enhance the ability to determine the presence of ice crystals by longer observation of reflectivity magnitude variation(s). The weather radar device may also be able to dwell a beam towards an area of interest for a longer period. This is not possible with existing mechanically scanned radar system. For a mechanically scanned weather radar with only one beam, the radar will need nearly thirty seconds to collect all of the data needed to fill the volumetric buffer. The one or more simultaneous beams of the weather radar device may allow much faster scanning of the entire volume. In some examples, the weather radar may cover sixty degrees of simultaneous elevation extent with one or more simultaneous beams to permit scanning the entire volume in three seconds.

FIG. 1 is a conceptual block diagram of a system 100 for determining the presence of ice crystals, in accordance with some examples of this disclosure. System 100 may include weather radar device 110, processing circuitry 120, and memory device 130. System 100 may also include other components not depicted in FIG. 1, such as a user interface configured to receive user inputs and present weather information and/or information relating to particles 160. System 100 may include memory device 130 configured to store data relating to weather such as threshold levels for temporal variance in reflectivity magnitudes.

Memory device 130 of system 100 may be configured to store data relating to the power and/or waveforms of radar signals 140 and 150 at locations in space (e.g., volumes in space). Processing circuitry 120 may be configured to classify a first portion of space as having ice crystals, a second portion of space as having mixed-phase water, and a third portion of space as having liquid water. Processing circuitry 120 may cause weather radar device 110 to scan the first portion of space that is classified as ice crystals.

In some examples, weather radar device 110 may be configured to transmit radar signals 140 as a single transmit beams. In some examples, weather radar device 110 may be configured to transmit some or all of radar signals 140 as part of some transmitted wide single beam. In some examples, weather radar device 110 may be configured to receive reflections of transmit radar signals 140 as separate receive beams at different times. The reflections of transmit radar signals 140 are shown in FIG. 1 as reflected radar signals 150. In some examples, weather radar device 110 may transmit radar signals 140 as a frequency-modulated continuous wave (FMCW) such that processing circuitry 120 can determine the range and velocity of particles 160 based on the difference between the frequencies of radar signals 140 and 150.

Reflected radar signals 150 may include radar returns from radar signals 140 that reflect off particles 160. Weather radar device 110 may be configured to transmit radar signals 140 as a continuous wave or distinct pulses. Weather radar device 110 may be further configured to receive reflected radar signals 150 at a first time and at a second time, or even more than two times. Each time may occur over a relatively short observation time or window, such as less than two seconds, less than three seconds, less than five seconds, less than eight seconds, or less than ten seconds to promote coherence in the measurements. Weather radar device 110 and processing circuitry 120 may be further configured to perform additional weather radar functions, such as performing volumetric reflectivity scans, predicting hail, predicting lightning, predicting areas of attenuated radar signal, tracking storm movements, tracking storm growth, and/or rendering weather information on a display.

In some examples, system 100 may be mounted on a vehicle such as any mobile object or remote object. In some examples, the vehicle may be an aircraft such as an airplane a helicopter or a weather balloon, or a space vehicle such as a satellite or spaceship. In yet other examples, the vehicle may include a land vehicle such as an automobile or a water vehicle such as a ship or a submarine. The vehicle may also be a manned vehicle or an unmanned vehicle, such as a drone, a remote-control vehicle, or any suitable vehicle without any pilot or crew on board. In some examples, system 100 may be mounted in the nose, the front, the rear, the bottom, and/or the top of the vehicle. In other examples, system 100 may be a stationary ground-based radar or an observatory.

System 100 may include weather radar device 110 and processing circuitry 120. System 100 may also include other components not depicted in FIG. 1, such as a user interface configured to receive user inputs and present weather information and/or information relating to at least some of the locations with particles 160. System 100 may include memory device 130 configured to store data relating to weather. In some examples, memory device 130 of system 100 may be configured to store waveforms of radar signals and threshold levels for received power of reflected radar signals 150. Memory device 130 may be configured to store threshold levels for reflectivity estimated from reflected radar signals 150. In some examples, memory device 130 may also be configured to store threshold levels for temporal variance in reflectivity estimated from reflected radar signals 150. The threshold level for reflectivity magnitudes, differences in reflectivity, and rates of change in reflectivity may be expressed in units of Z or dBZ.

For example, processing circuitry 120 may be configured to determine the presence of ice crystals in particles 160 based on the reflectivity magnitudes and temporal variance in reflectivity magnitudes for reflected radar signals 150; in some examples additional available information, for example but not limited to static air temperature, altitude, reflectivity magnitude spatial distribution, and/or turbulence levels may aid the detection of ice crystals presence. The additional information may be received from other aircraft systems or sensors (e.g., static air temperature, altitude) or from the standard operations of system 100 (e.g., reflectivity spatial distribution). An accurate determination of the presence, concentration, and likelihood of ice crystals may be useful to vehicles and meteorologists because, for example, ice crystals may cause damage to vehicles. Therefore, processing circuitry 120 may be configured to determine an estimated altitude of the melting layer based at least in part on an estimated altitude range of the bright band. Example details of determining an estimated altitude of the melting layer may be found in U.S. patent application Ser. No. 15/782,573 filed on Oct. 12, 2017, entitled "Melting Layer Estimation by Weather Radar Device." In some examples, location of the bright band is not needed for melting layer altitude estimation. An accurate determination of the melting-layer altitude may be desirable because ice crystals may form in higher quantities particularly above the melting layer. In some examples, ice crystals detection may be performed only above the melting layer. Ice crystals may be hazardous for vehicles and engines, such that it may be desirable for vehicles to avoid travelling through ice crystals areas.

Weather radar device 110 may include an array of antennas that are configured to transmit radar signals 140 and receive reflected radar signals 150. In some examples, weather radar device 110 may transmit radar signals 140 in a range of directions with or without a mechanically scanning device. In some examples, weather radar device 110 may be a phased-array radar device, and the electronic steering of the phased-array radar device may be faster, and/or more energy efficient, as compared to other radar devices with antennas that are mechanically steered. In some examples, weather radar device 110 may be a phased-array radar device that also includes a mechanical steering element in combination with electronic steering of radar signals. Weather radar device 110 may include a single-polarization radar device, which may include a simpler and less expensive hardware than a dual-polarization radar device. The techniques of this disclosure allow a single-polarization radar device to determine the presence of ice crystals without necessarily needing dual-polarization hardware. Weather radar device 110 may be configured to operate in a frequency band such as X band, K band, Ka band, or any other frequency band.

Processing circuitry 120 may be configured to control weather radar device 110 by causing weather radar device 110 to transmit radar signals 140. Processing circuitry 120 may be configured to control the direction and time of transmission of radar signals 140. Processing circuitry 120 may be further configured to analyze reflected radar signals 150, including the intensity, frequency, time of arrival, and angle of arrival of reflected radar signals 150. Processing circuitry 120 may be configured to determine the reflectivity magnitudes along a beam formed by processing circuitry 120 from corresponding reflected radar signals 150.

For example, processing circuitry 120 may be configured to form two or more beams on receive. Processing circuitry 120 may form the receive beams such that the beams are vertically stacked, horizontally arrayed, or positioned in arbitrary directions. In some examples, processing circuitry 120 may be configured to form any number of beams on receive. Processing circuitry 120 may be configured to determine the reflectivity magnitude of particles 160 based on reflected radar signals 150. Processing circuitry 120 may be further configured to determine a temporal variance in reflectivity magnitudes for particles 160 for reflected radar signals 150 at two or more times.

Processing circuitry 120 may be configured to determine the presence or absence of ice crystals in particles 160 based on reflected radar signals 150. Processing circuitry 120 may also be configured to determine the likelihood that ice crystals exist in particles 160 and/or the concentration of ice crystals particles 160 based on reflected radar signals 150. Processing circuitry 120 may be configured to determine the concentration of ice crystals based on the temporal variance, first magnitude, and second magnitude, or more magnitudes, when available. In some examples, standard deviation may be used instead of temporal variance. The magnitudes may be indicative of the concentration of water in a volume of space, and the temporal variance may indicate the presence of ice crystals. Alternatively or additionally, processing circuitry 120 may be configured to determine a condition that is indicative of the presence or likelihood of ice crystals, such as the temporal variance in reflectivity magnitudes, based on reflected radar signals 150. The likelihood that ice crystals are present may be expressed as a percentage.

Processing circuitry 120 may be configured to transmit radar signals 140 as a continuous wave or a pulsed signal. Processing circuitry 120 may then be configured to receive reflected radar signals 150 at two or more times. Processing circuitry 120 may determine reflectivity magnitudes of reflected radar signals 150 for each time based on the characteristics of reflected radar signals 150 such as amplitude, signal strength, signal intensity, or power level. The reflectivity of reflected radar signals 150 may be based on the power level of reflected radar signals 150 compared to the power level of radar signals 140. Processing circuitry 120 may be configured to form a beam that points from weather radar device 110 in the direction of particles 160. Processing circuitry 120 may determine the radar signals that reflected from particles 160, in contrast to the radar signals that reflected from other particles, based on the time delay and other characteristics of the reflected radar signals.

Processing circuitry 120 may be configured to determine weather conditions based on the reflected radar signals 150. Processing circuitry 120 may be configured to analyze the amplitude, the frequency, the time, and/or the phase shift of the reflected radar signals 150. In some examples, processing circuitry 120 may be configured to determine the distances or ranges to particles 160 based on the time between transmission and receipt.

In some examples, processing circuitry 120 may be configured to determine the direction of travel and velocity of particles 160 based on the difference in frequency between a transmitted signal and a returned signal according to the Doppler effect. By Doppler processing, processing circuitry 120 may differentiate particles 160 from mainlobe clutter.

In some examples, processing circuitry 120 may be configured to determine an estimated altitude of the melting layer and/or the bright band in order to search for ice crystals. The bright band may be located at an altitude with the highest reflectivity magnitudes, which is usually below the melting layer. The melting layer, at which solid water begin melting, may be located at an altitude with the highest rate of change in reflectivity magnitudes. Ice crystals are typically located somewhere above the melting layer. Ice crystals may also be more common in and above storm clouds, as well as downwind from storm clouds.

Based on determining the estimated altitude of the melting layer, weather radar device 110 may be configured to search for ice crystals at altitudes above the melting layer. Weather radar device 110 may be configured to conduct a dedicated search for ice crystals between volumetric scans that weather radar device 110 may be configured to perform every ten seconds, every twenty seconds, or every thirty seconds, for example. In other examples, weather radar device 110 does not need to conduct a dedicated search and may search for ice crystals during the volumetric scan.

In some examples, the weather radar device 110 and/or processing circuitry 120 may perform classification of portions of space in the atmosphere as ice crystals and liquid, or as ice crystals, mixed phase, and liquid. The weather radar device 110 and/or processing circuitry 120 may perform the classification based on reflectivity magnitude, temporal reflectivity magnitude variance, and/or general atmospheric topology (liquid water is typically present below mixed phase, and mixed phase is typically present below ice crystals). In some examples, altitude and temperature information may be used for classification of portions of space in the atmosphere as well. Weather radar device 110 may be further configured to conduct a search for ice crystals in the parts of the atmosphere that weather radar device 110 and/or processing circuitry 120 has classified as ice crystals. In some examples, weather radar device 110 and/or processing circuitry 120 may also estimate ice crystal concentration. In other examples, the weather radar device 110 and/or processing circuitry 120 may also estimate ice crystal concentration within the mixed phase.

Each of particles 160 may be a distribution of particles, such as any mobile object or remote object such as water molecules, a speck of dust, and/or any other particle. Particles 160 may be anything that reflects radar signals 140 back to weather radar device 110 as reflected radar signals 150. In some examples, particles 160 may be liquid water particles, frozen water particles such as ice crystals, hail, or snowflakes, and/or partially frozen or partially melted water particles, or any combination of objects mentioned above.

Particles 160 may occupy a volume of space in the atmosphere. In some examples, the volume of space may be a cubic volume such as a voxel. Weather radar device 110 may transmit radar signals 140 in a single transmit beam or more than one beam. Some of the radar signals that bounce off particles in the volume of space (e.g., particles 160) may return to the receive antenna(s) of weather radar device 110 as reflected radar signals 150. Processing circuitry 120 may determine the temporal variance in reflectivity magnitudes for particles by determining the temporal variance in reflectivity magnitudes for the volume of space. "Temporal" variance may refer to variance in reflectivity magnitudes over time.

In accordance with the techniques of this disclosure, processing circuitry 120 may be configured to determine the presence of ice crystals based on the temporal variance in reflectivity magnitudes. The determination of the temporal variance may be based on two or more measurements across an interval of a couple of milliseconds or longer. An accurate determination of the presence, likelihood, and/or concentration of ice crystals may be desirable because ice crystals may be hazardous to vehicles, including the engines, sensors, and probes onboard the vehicles. In particular, high-performance engines may be especially vulnerable to ice crystals. Ice crystals may also be correlated with turbulence in the atmosphere. Therefore, an accurate determination of the presence, likelihood, and/or concentration of ice crystals may improve vehicle safety by improving the detection of ice crystals.

Figure 2:
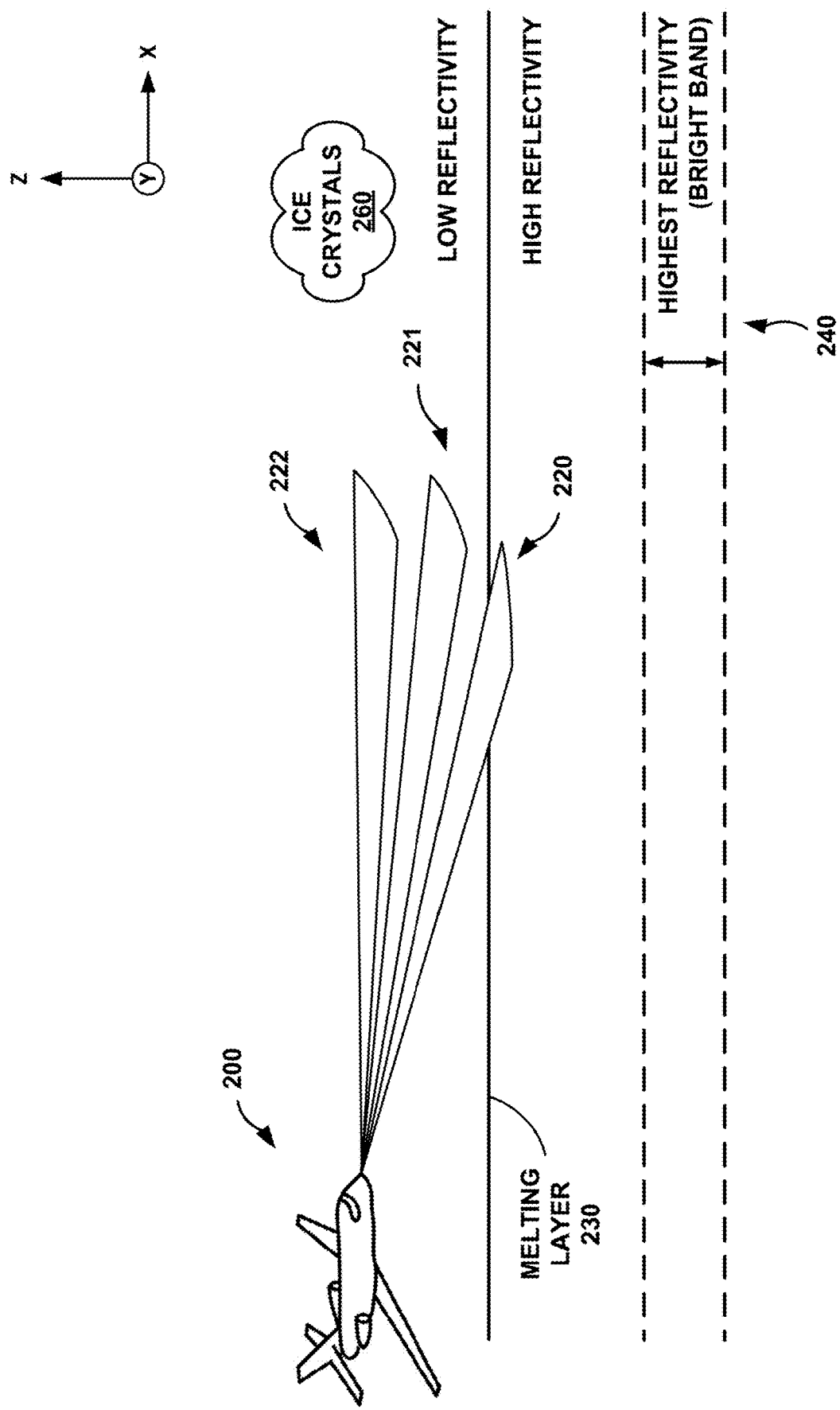
FIG. 2 shows a diagram of a vehicle transmitting and/or receiving three radar beams towards the melting layer, in accordance with some examples of this disclosure.

FIG. 2 shows a diagram of a vehicle 200 transmitting and/or receiving three radar beams 220-222 towards the melting layer 230, in accordance with some examples of this disclosure. FIG. 2 depicts vehicle 200 as an aircraft, but vehicle 200 may be any vehicle such as a helicopter, a weather balloon, a space vehicle such as a satellite or spaceship, a land vehicle such as an automobile, and/or a water vehicle such as a ship or a submarine. In some examples, a system of this disclosure may be mounted or positioned in a non-mobile place such as a stationary weather radar or an observatory. If vehicle 200 is an aircraft, vehicle 200 may typically fly at thirty-five thousand feet or forty thousand feet, and melting layer 230 may typically exist at approximately fifteen thousand feet or twenty thousand feet. Ice crystals 260 may be present near melting layer 230 or at altitudes above melting layer 230.

In accordance with the techniques of this disclosure, a weather radar device onboard vehicle 200 may be configured to transmit radar signals and receive radar beams 220-222. In some examples, the processing circuitry may be configured to form more or fewer than three beams based on the reflected radar signals. In some examples, the weather radar device onboard vehicle 200 may be configured to transmit radar signals in a single transmit beam or a series of transmit beams. The weather radar device may be a phased-array radar device that is configured to receive the reflected radar signals and process the reflected radar signals by determining one or more simultaneous beams of reflected radar signals. The weather radar device may be configured to determine radar beams by determining parameters of the reflected radar signals such as phase shift, time of arrival, signal power, and/or any other signal characteristics.

The processing circuitry onboard vehicle 200 may be configured to determine an estimated altitude of melting layer 230 and search for ice crystals above the estimated altitude of melting layer 230. Melting layer 230 may be located at or near the transition between low reflectivity magnitudes and high reflectivity magnitudes. Bright band 240 may have the highest reflectivity magnitudes, as compared to the reflectivity magnitude at other altitudes. Water molecules in bright band 240 may be frozen and/or liquid. Liquid water on the surfaces of hail, ice, and/or snow in bright band 240 may have higher reflectivity magnitudes than completely frozen water or completely melted water. The altitudes in bright band 240 may be lower than the altitude of melting layer 230.

Figure 3:
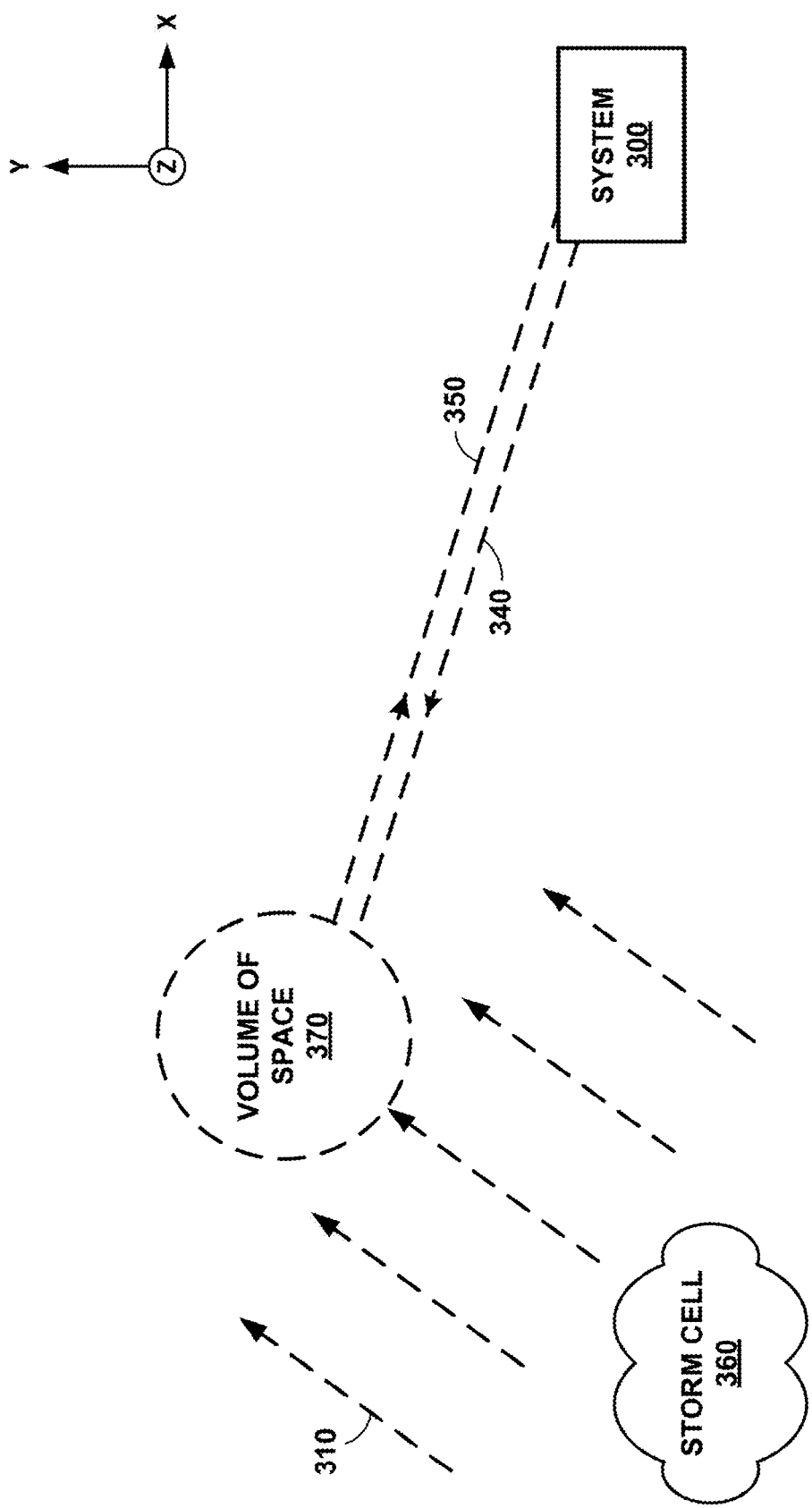
FIG. 3 shows a system configured to scan a volume of space downwind from a storm cell, in accordance with some examples of this disclosure.

FIG. 3 shows a system 300 configured to scan a volume of space 370 downwind from a storm cell 360, in accordance with some examples of this disclosure. System 300 may be configured to scan volume of space 370 based on beamforming performed by processing circuitry on reflected radar signals 350. System 300 may use beamforming to create a beam in the direction of volume of space 370. System 300 may also filter, isolate, or enhance signals based on depth or range so that the processing circuitry can determine reflectivity magnitudes for volume of space 370.

System 300 may be configured to determine the location of storm cell 360 based on the reflectivity magnitudes of radar signals that bounce off particles in storm cell 360. The determination of the location of storm cell 360 may be based on determining the distance from system 300 to storm cell 360 and the direction of reflected radar signals 350. System 300 may be configured to determine the direction from which radar signals 350 were received based on beamforming (e.g., digital beamforming) and/or complex weighting.

System 300 may also be configured to track the storm cells (e.g., storm cell 360) and determine velocity 310 (e.g., direction and speed) of wind near storm cell 360. System 300 may then be configured to search for ice crystals in volume of space 370 downwind from storm cell 360. The processing circuitry of system 300 may be configured to cause a weather radar device to scan volume of space 370. Ice crystals may be low-mass particles, relative to the surface area of the ice crystals, and the wind may carry the ice crystals farther downwind than the wind carries liquid water.

System 300 may be configured to determine the presence, likelihood, and/or concentration of ice crystals in volume of space 360 based on reflected radar signals 350. System 300 may transmit radar signals 340 as part of a relatively wide transmit beam. Reflected radar signals 350 may bounce off particles in volume of space 360, such as ice crystals.

In some examples, system 300 may be configured to perform a full scan of the atmosphere, including a scan of volume of space 370. A full scan may not necessarily include a 360-degree scan. For example, an aircraft-mounted weather radar device may be configured to scan one hundred and twenty degrees of space at a range of several hundred nautical miles. For purposes of this disclosure, a "full scan" may refer a scan of a field of regard for the weather radar device.

After performing the full scan, the weather radar device may perform a partial scan by dwelling in volume of space 370 by forming one or more beams towards volume of space 370. In some examples, the full scan of the field of regard may take three seconds or five seconds. Between full scans, the weather radar device may be configured to perform partial scans by dwelling in areas of interest (i.e., subvolumes of interest), such as volume of space 370 to detect ice crystals or other weather conditions. The processing circuitry of system 300 may then be configured to determine a likelihood that ice crystals are present in volume of space 370 based on the reflectivity magnitude(s) and the temporal variance in reflectivity magnitudes of radar signals 350 received by system 300 while dwelling on volume of space 370. In some examples, average reflectivity magnitude may be used instead of each reflectivity magnitude. In other examples, any reflectivity magnitude measurement, minimum reflectivity magnitude measurement, or maximum reflectivity magnitude measurement or any other statistical representation of reflectivity magnitude value (for example but not limited to median reflectivity magnitude value) may be used. In some examples, additional available information that may include one or more of static air temperature information, altitude information, estimated turbulence levels, spatial reflectivity magnitude distribution, and/or other information, may be used by system 300 to determine the likelihood that ice crystals are present in volume of space 370. In other examples, system 300 may collect the temporal variance in reflectivity magnitudes while performing the full scan; in such examples, the full scan duration might be possibly increased.

FIGS. 4A-4D show examples of shapes of ice crystals at four different locations. A memory device may be configured to store characteristics of ice crystals. When a weather radar device is operating in a specific geographic region, processing circuitry may be configured to search for ice crystals by matching detected particles to the known characteristics for ice crystals in that geographic region. The weather radar device may be configured to search or look for certain characteristics of ice crystals based on the geographic region.

For example, the processing circuitry may be configured to determine a threshold level for the temporal variance based on the geographic region. For example, the processing circuitry may be configured to associate an oceanic region (e.g., FIG. 4C) with lower threshold level(s) and associate a continental region (e.g., FIGS. 4A and 4B) with higher threshold level(s). The temporal variance (e.g., difference in reflectivity over time) for a continental region may range from zero dBZ to four dBZ, and the temporal variance for an oceanic region may range from zero dBZ to five dBZ. The difference in reflectivity over time may be equal to the ratio of two measured magnitudes of reflectivity. One of the measured magnitudes of reflectivity will be greater than or equal to the other measured magnitude of reflectivity, so the ratio may be at least one if the larger measured magnitude of reflectivity is used as the numerator.

Figure 4A:
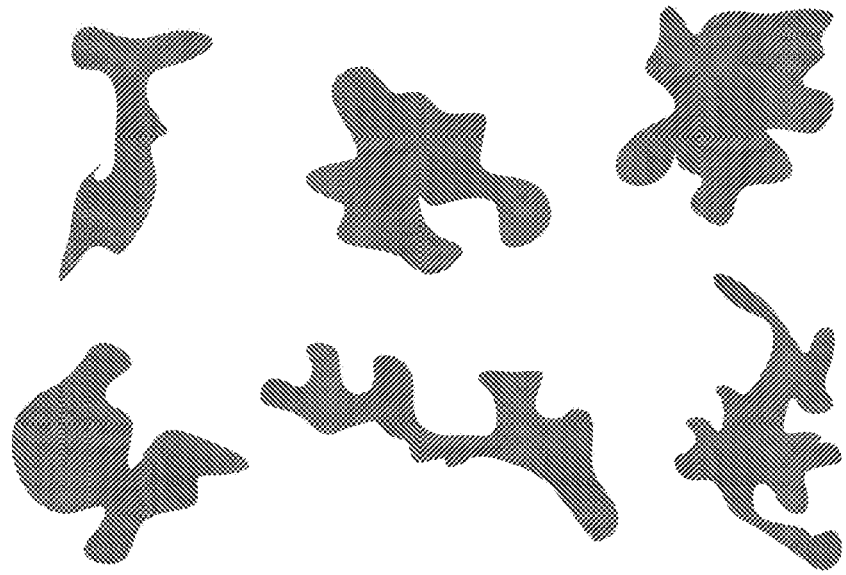
FIGS. 4A-4D show examples of shapes of ice crystals at four different locations.
Figure 4B:
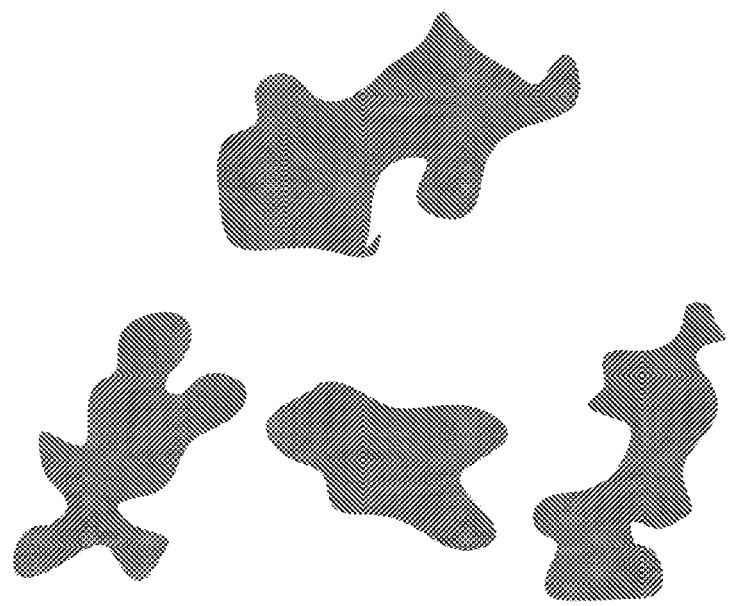

FIG. 4A depicts ice crystals that may be located in an anvil cloud above a large continent (e.g., the state of Colorado). The anvil cloud may be a cumulonimbus storm cloud that produces a thunderstorm. The ice crystals in the continental anvil cloud may have irregular shapes, such as salamander shapes, amoeba shapes, meandering shapes, and the like. FIG. 4B depicts ice crystals that may be located in an originally oceanic anvil cloud (e.g., cumulonimbus) that moved above a large continent (e.g., clouds from the ocean that move over the state of Florida). The ice crystals in the originally oceanic-above-the continent anvil cloud may have irregular shapes, similar to the shapes of FIG. 4A except slightly rounder than the shapes of FIG. 4A. The ice crystals in FIG. 4B may result in lower temporal variance in reflectivity magnitudes than the ice crystals in FIG. 4A.

Figure 4C:
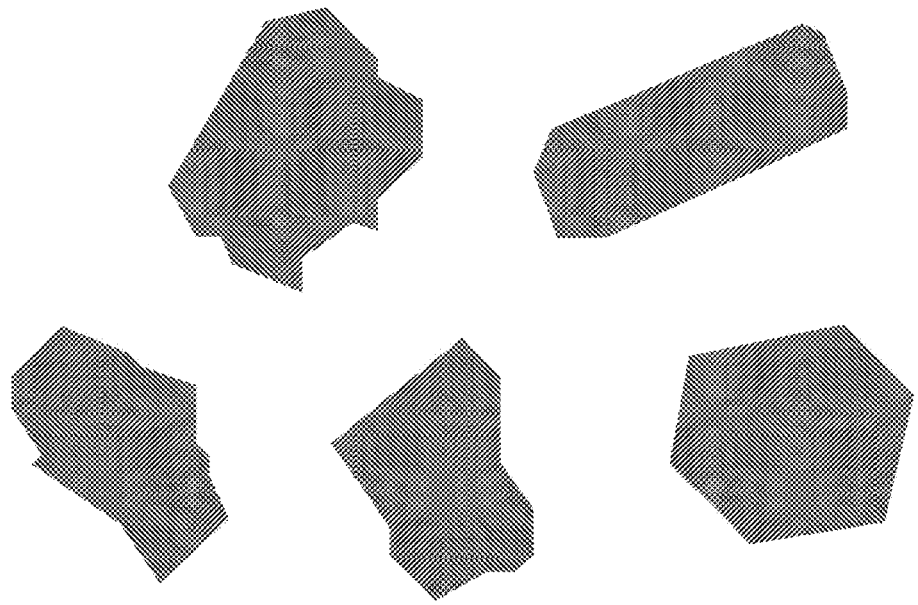
Figure 4D:
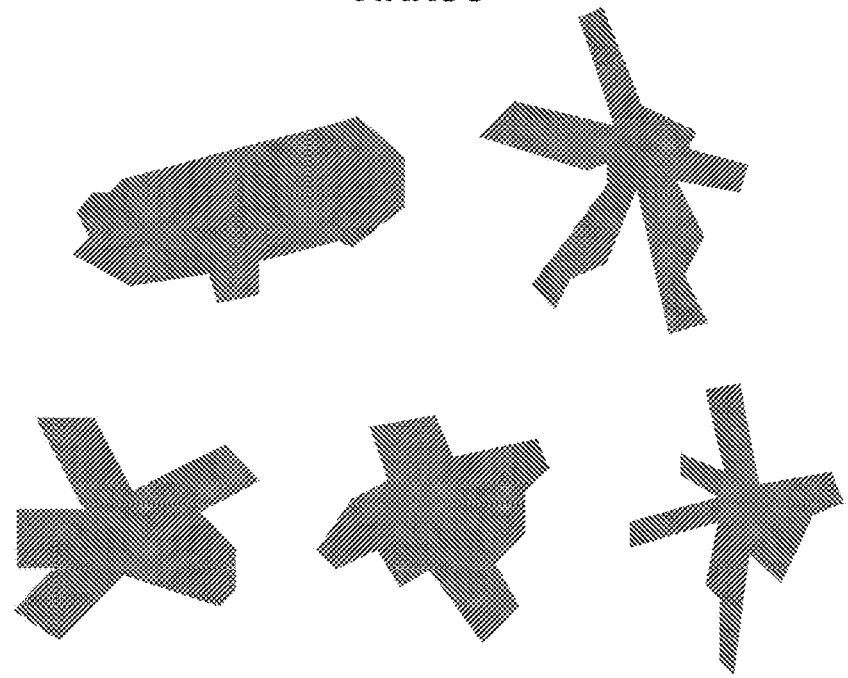

FIG. 4C depicts ice crystals that may be located in an anvil cloud (e.g., cumulonimbus) above an oceanic location (e.g., the Kwajalein atoll in the Pacific Ocean). The ice crystals in the oceanic anvil cloud may have round or semi-round shapes that result in lower temporal variance in reflectivity magnitudes than the ice crystals in FIGS. 4A and 4B. FIG. 4D depicts ice crystals that may be located in a cirrus cloud above a mid-latitude location (e.g., the continental United States). The ice crystals in the mid-latitude cirrus clouds may have irregular shapes that may result in higher temporal variance in reflectivity magnitudes than the ice crystals of FIG. 4C. Irregularly shaped and asymmetrically shaped ice crystals may have a tumbling motion in the air that results in varying reflectivity for incoming radar signals that may occur over fractions of a second. The changing orientation of the crystals relative to the incident radar polarization may cause the variance in reflectivity.

FIGS. 4E-4H show examples of shapes of ice crystals across time. For the spherical ice crystals of FIGS. 4E and 4F, the measurements of reflectivity magnitude at a first time and a second time may be equal or nearly equal. Therefore, the temporal variance in reflectivity magnitudes for the spherical ice crystals of FIGS. 4E and 4F may be relatively low. Ice has a far lower reflectivity than water droplets, so a radar system can distinguish between spherical rain and spherical ice crystals based on radar signal amplitude (e.g., reflectivity magnitude). The radar system can also distinguish based on the altitude by assuming that detections above the freezing altitude are ice, not liquid water. Under rare conditions, super-cooled water can remain in liquid form, but super-cooled liquid water is unusual and may exist only around the melting layer.

For the elliptical ice crystals of FIGS. 4G and 4H, the measurements of reflectivity magnitude at a first time and a second time may be different. Therefore, the temporal variance in reflectivity magnitudes for the elliptical ice crystals of FIGS. 4G and 4H may be relatively high, as compared to the temporal variance in reflectivity magnitudes for the spherical ice crystals of FIGS. 4E and 4F.

In the example depicted in FIG. 4G, the number of horizontally oriented ice crystals may be equal to the number of vertically oriented ice crystals. In the example depicted in FIG. 4H, the number of horizontally oriented ice crystals may be less than the number of vertically oriented ice crystals. Thus, a weather radar device that receives horizontal reflected radar signals from the ice crystals of FIGS. 4G and 4H (e.g., a vehicle-mounted weather radar device that transmits and receives at substantially horizontal angles), may measure different reflectivity magnitudes for the ice crystals of FIGS. 4G and 4H. The different reflectivity magnitudes may be caused by the ratio of horizontally oriented ice crystals to vertically oriented ice crystals at two times.

Figure 5:
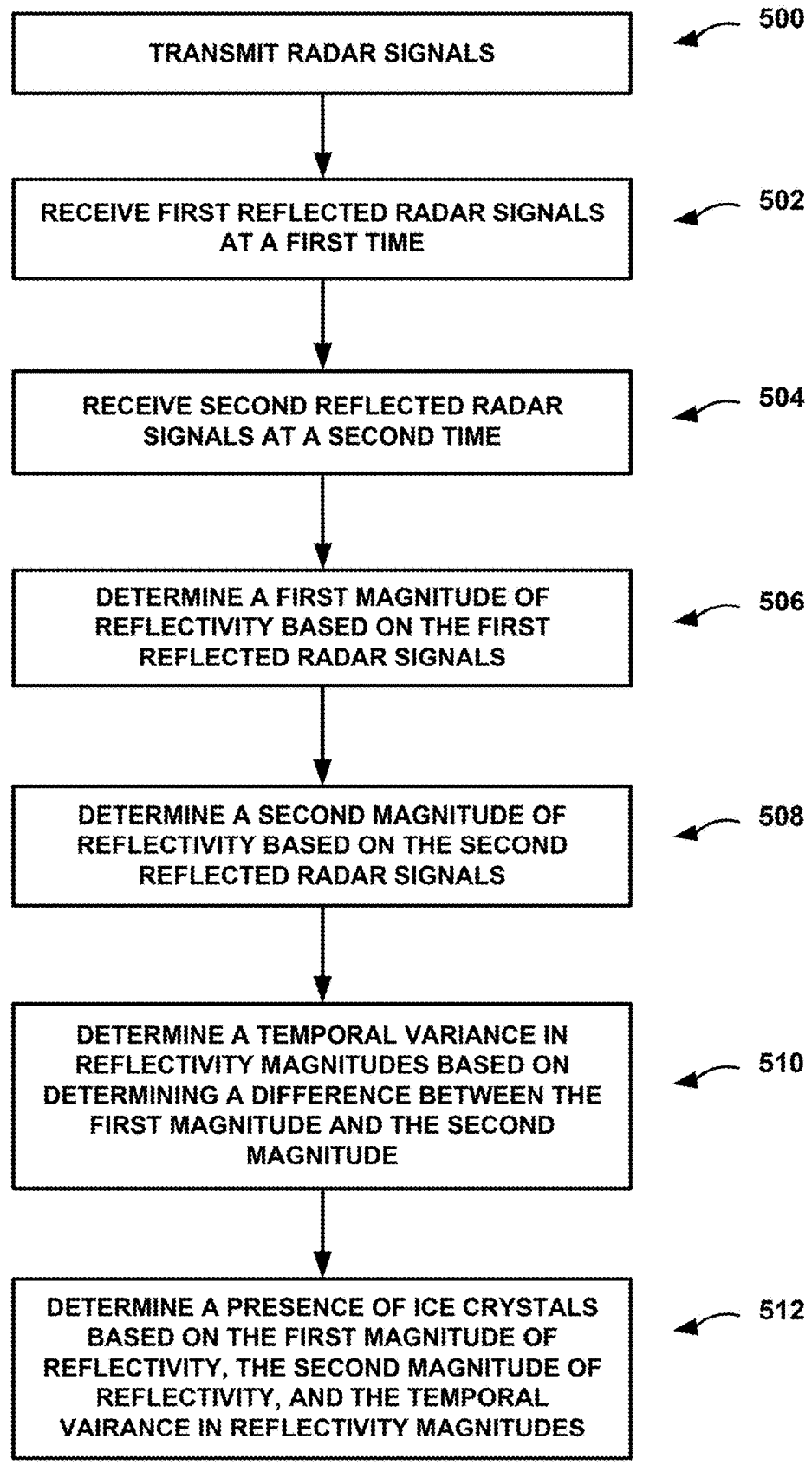
FIG. 5 shows a flowchart for example techniques for determining the presence of ice crystals, in accordance with some examples of this disclosure.

FIG. 5 shows a flowchart for example techniques for determining the presence of ice crystals, in accordance with some examples of this disclosure. The techniques of FIG. 5 are described with reference to system 100 of FIG. 1, including weather radar device 110 and processing circuitry 120, although other components may perform similar techniques.

In the example of FIG. 5, weather radar device 110 transmits radar signals 140 (500). Weather radar device 110 may be configured to transmit radar signals 140 using an electronically steered radar that includes an array of antennas. In other examples, weather radar device 110 may be mechanically scanned system. In some examples, weather radar device 110 may transmit a single transmit beam that includes radar signals 140. In the example of FIG. 5, weather radar device 110 receives reflected radar signals 150 at a first time (502) and at a second time (504). In some examples, processing circuitry 120 may be configured to determine one or more receive beams based on the received radar signals that include reflected radar signals 150. Processing circuitry 120 may be configured to determine the range of each of particles 160 based on the time delay between transmission of radar signals 140, for example, and receipt of reflected radar signals 150. Processing circuitry 120 may also be configured to determine the angle of receipt based on the phase shift across the antenna array of weather radar device 110. Processing circuitry 120 may be configured to determine the altitudes of particles 160 and the altitude of weather radar device 110.

In the example of FIG. 5, processing circuitry 120 determines a first magnitude of reflectivity based on the reflected radar signals 150 received at the first time (506). Processing circuitry 120 may also be configured to determine a second magnitude of reflectivity based on the reflected radar signals 150 received at the second time (508). The reflectivity magnitudes may be based on the amplitude and/or other characteristics of reflected radar signals 150.

In the example of FIG. 5, processing circuitry 120 determines a temporal variance in reflectivity magnitudes (510). In order to determine the temporal variance, processing circuitry 120 may determine a difference between the first magnitude and the second magnitude by subtracting the two magnitudes. Processing circuitry 120 may have a threshold window of time for the two measurements in order to promote coherence in the calculation. For example, processing circuitry 120 may cause weather radar device 110 to take the second measurement within five seconds of the first measurement. In some examples, processing circuitry 120 may be configured to cause weather radar device 110 to measure the reflectivity of the volume of space more than two times during a time window. Processing circuitry 120 may be configured to determine the temporal variance based on the difference between the minimum reflectivity magnitude and the maximum reflectivity magnitude during the time window. Alternatively, processing circuitry 120 may be configured to determine the temporal variance based on the standard deviation, or some other measure of variation, of the reflectivity magnitudes.

In the example of FIG. 5, processing circuitry 120 determines a presence of ice crystals based on the first magnitude of reflectivity, the second magnitude of reflectivity, and the temporal variance in reflectivity magnitudes (512). For example, processing circuitry 120 may be configured to determine that ice crystals are present in a volume of space if both reflectivity magnitudes and the temporal variance exceed applicable threshold levels. Memory device 130 may be configured to store the applicable threshold levels. For example, the temporal variance threshold level may be three dBZ, and processing circuitry 120 may adjust the magnitude threshold level according to estimated temporal variance. In some examples, the reflectivity threshold level might be fifteen dBZ for temporal variances below three dBZ and it might be twenty dBZ for temporal variance equal or above three dBZ, since more elliptical shapes indicate higher reflectivity corresponding to the same Ice Water Content. These threshold levels are possibilities, and, in other examples, processing circuitry 120 may use different threshold levels. Processing circuitry 120 may be further configured to determine that particles 160 include ice crystals if the temporal variance exceeds three dBZ within a window of time such as few milliseconds or a longer time including a number of seconds.

After determining the presence of ice crystals, processing circuitry 120 may be configured to generate an output indicating the presence of ice crystals. For example, processing circuitry 120 may be configured to store the location of particles 160 to memory device 130. Processing circuitry 120 may be further configured to store the likelihood that ice crystals are present in particles 160 and/or the concentration of ice crystals in particles 160. Processing circuitry 120 may be configured to generate an alert in response to determining the presence of ice crystals, such as an audio alert, a visual alert, and/or a map-based alert.

FIGS. 6-9 depict example hardware configurations for weather radar device 110. In some examples, weather radar device 110 may be configured to operate in FMCW and/or pulsed mode. Additionally or alternatively, weather radar device 110 may also include other hardware configurations. Example details of weather radar devices may be found in U.S. patent application Ser. No. 14/488,129 filed on Sep. 16, 2014, entitled "Digital Active Array Radar" and U.S. patent application Ser. No. 14/488,154 filed on Sep. 16, 2014, entitled "Digital Active Array Radar," which are incorporated herein by reference in their entirety.

Figure 6:
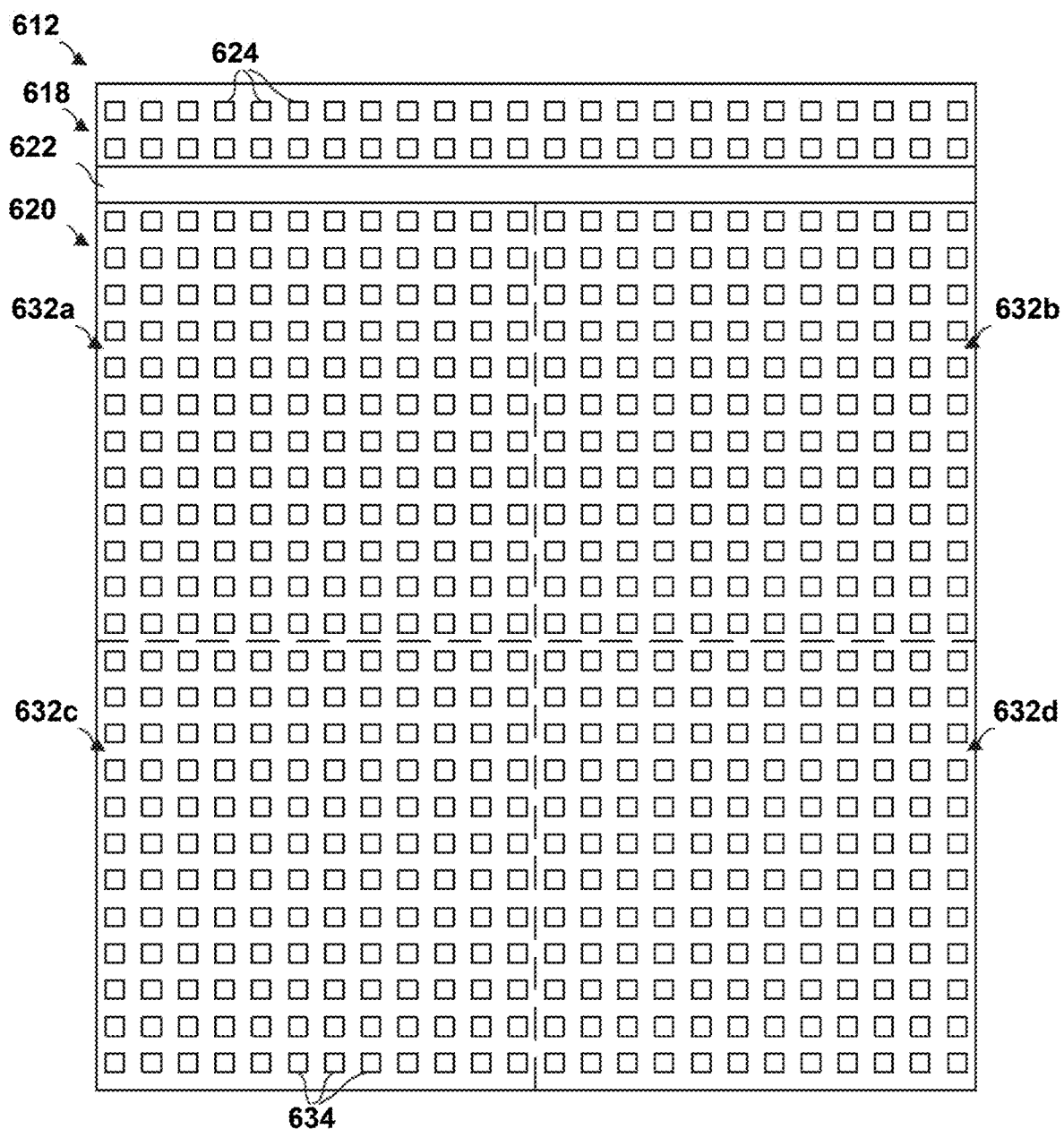
FIG. 6 is a conceptual diagram illustrating an example FMCW radar array.

FIG. 6 is a conceptual diagram illustrating an example FMCW radar array 612. FMCW radar array 612 is one example of weather radar device 110. In some examples, weather radar device 110 may include more or fewer antenna elements than FMCW radar array 612. In the example depicted in FIG. 6, FMCW radar array 612 includes a transmit array 618 and a receive array 620. The example of FMCW radar array 612 shown in FIG. 6 also includes electronic bandgap (EBG) isolator 622 disposed between the transmit antenna and the receive antenna. Transmit array 618 and receive array 620 are physically proximate to each other, e.g., located in a single housing such as housing 713 shown in FIGS. 7A and 7B.

Transmit array 618 includes a plurality of transmit antenna elements 624. In some examples, transmit array 618 includes two rows (oriented horizontally in the example of FIG. 6) of transmit antenna elements 624, and each row includes twenty-four transmit antenna elements 624. In general, transmit array 618 may include at least one row of transmit antenna elements 624, and each row may include a plurality of antenna elements 624. In some examples, adjacent transmit antenna elements 624 may be spaced apart in the horizontal direction by approximately one-half of the wavelength of the transmit beam generated using transmit array 618.

As shown in FIG. 6, receive array 620 may be conceptually divided into quadrants 632a, 632b, 632c, 632d (collectively, "quadrants 632"). In some examples, receive array 620 is also electrically divided into quadrants 632, e.g., based on the electrical connections of the receive antenna elements 634 to receive electronics that process the signals detected by receive antenna elements 634. Receive signals from each of receive antenna elements 634 may be used to generate monopulse tracking beams using monopulse beam arithmetic, and dividing receive array 620 into quadrants 632 may facilitate generation of monopulse tracking beams, as described below. In some examples, each of quadrants 632 includes the same number of receive antenna elements 634. For example, in the implementation shown in FIG. 6, each of quadrants 632 includes twelve rows of twelve receive antenna elements 634, for a total of one hundred and forty-four receive antenna elements 634 in each of quadrants 632 (each row is oriented horizontally and each column is oriented vertically in the example of FIG. 6). Hence, in the illustrated example, receive array 620 includes twenty-four rows of receive antenna elements 634, and each row includes twenty-four receive antenna elements 634.

In other examples, receive array 620 may include a different number of receive antenna elements 634. For example, receive array 620 may include more or fewer rows of receive antenna elements 634, and each row may include more or fewer receive antenna elements 634 than depicted in FIG. 6. In general, receive array 620 may include a plurality of rows of receive antenna elements 634 and each row may include a plurality of receive antenna elements 634. In some examples, adjacent receive antenna elements 634 may be spaced apart in the horizontal direction by approximately one-half of the wavelength of the transmit beam generated using transmit array 618.

In some examples, receive antenna elements 634 may be arranged in a square array of receive antenna elements 634 (e.g., the number of rows of receive antenna elements 634 is the same as the number of receive antenna elements 634 in each row). In other examples, receive antenna elements 634 may be arranged in a rectangular array of receive antenna elements 634 (e.g., the number of rows of receive antenna elements 634 is different than the number of receive antenna elements 634 in each row). Additionally or alternatively, in some examples, the number of receive antenna elements 634 in a row of receive array 620 may be different than the number of transmit antenna elements 624 in a row of transmit array 618. Alternatively, or additionally, receive antenna elements 634 may not be arranged in rows and columns as depicted in FIG. 6; instead, receive antenna elements 634 may be arranged in another geometric or non-geometric array.

Figure 7A:
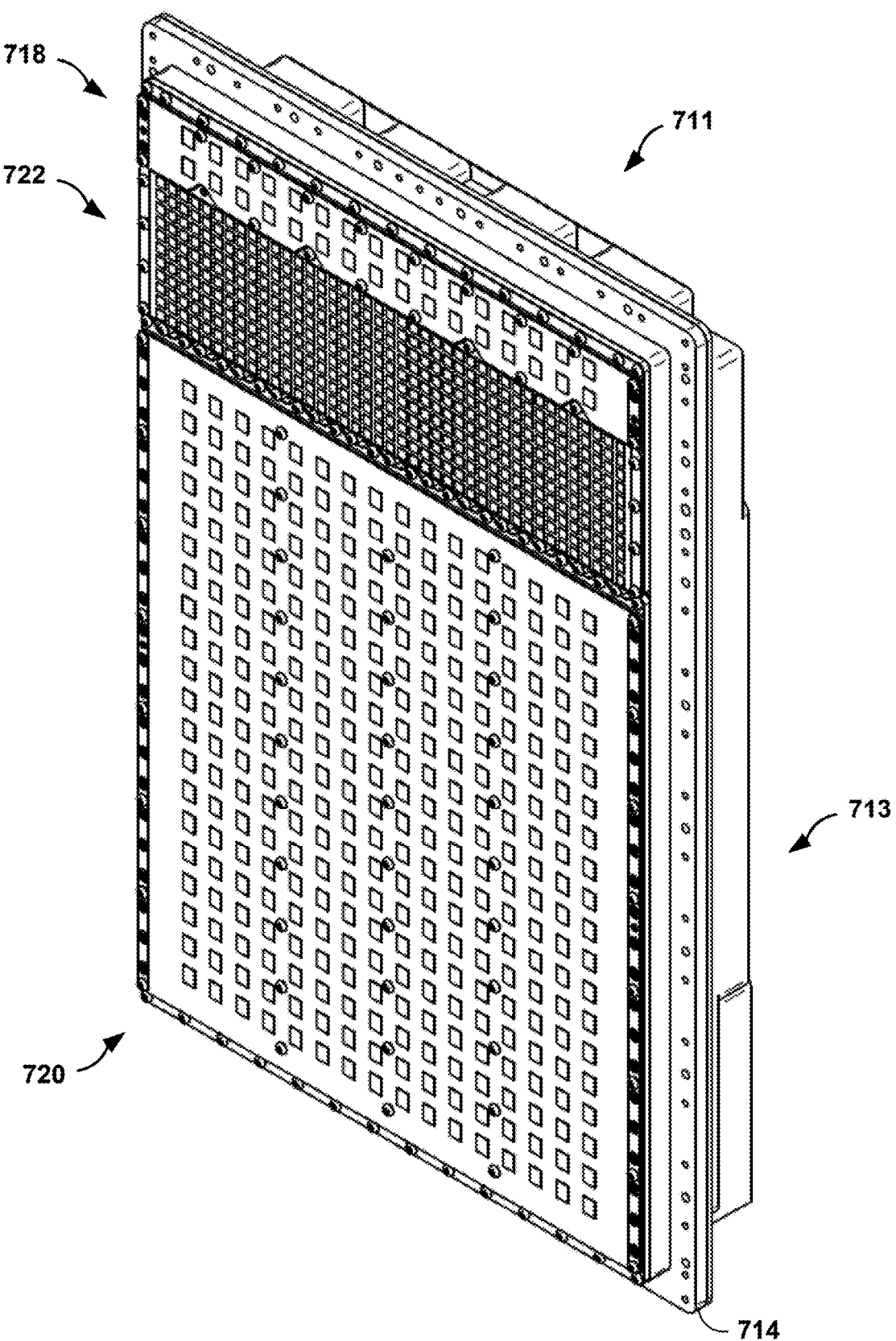
FIGS. 7A and 7B are front- and back-view diagrams of an example FMCW radar device.
Figure 7B:
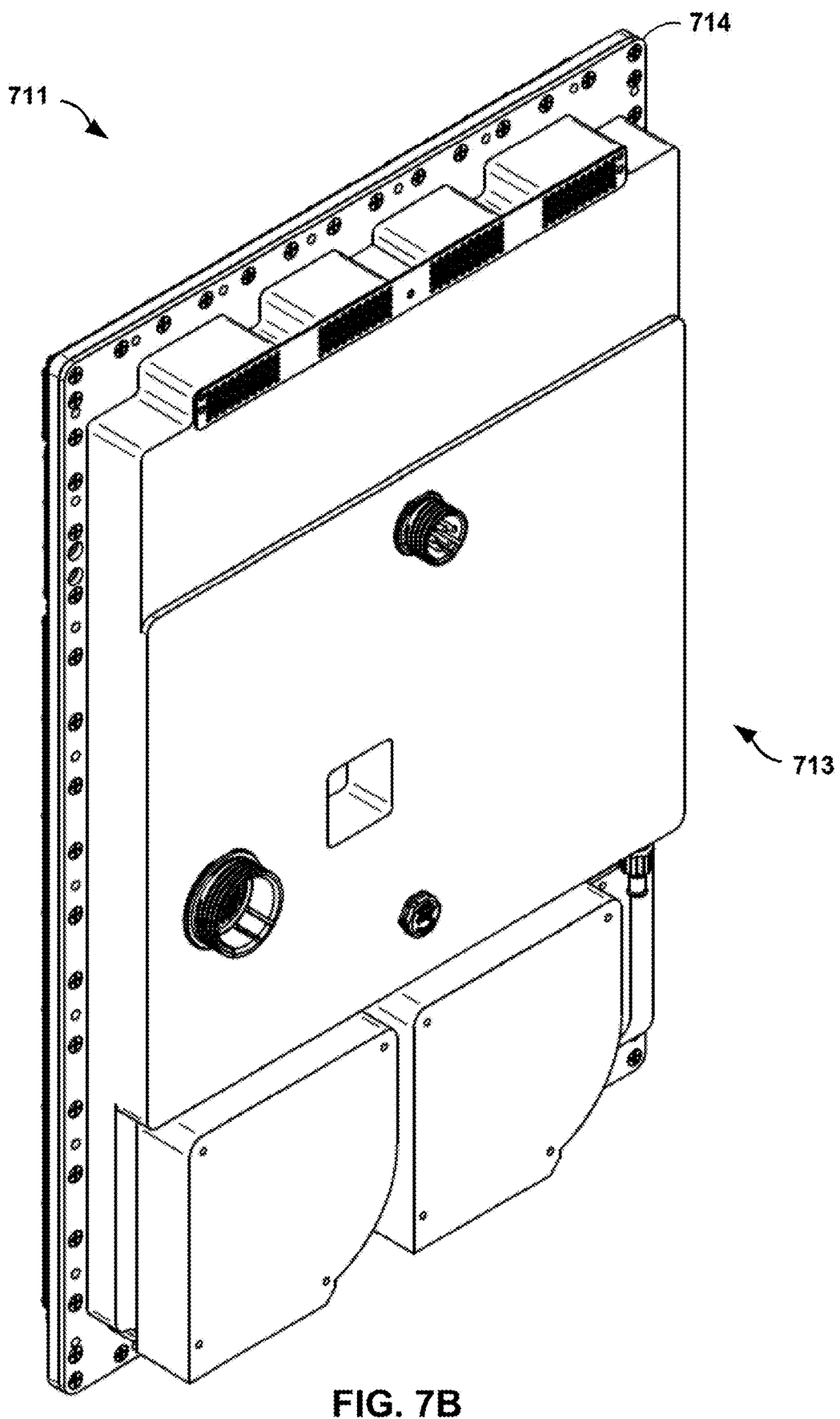

FIGS. 7A and 7B are front- and back-view diagrams of an example FMCW radar device. Phased-array radar panel 711 is one example of a radar device, or part of a radar device, of this disclosure. In some examples, phased-array radar panel 711 may include a plurality of printed circuit boards disposed substantially parallel to each other and to the front surface of phased-array radar panel 711. In some examples, the top layer printed board may be referred to as a patch layer, and may include antenna elements, such as transmit array 718, EBG isolator 722 and receive array 720 and radio frequency components. Transmit array 718 and receive array 720 may be similar or the same as the array of integrated radar device 811 depicted in FIGS. 8A and 8B. In the example of FIGS. 7A and 7B, EBG isolator 722 is disposed between the transmit antenna array 718 and the receive antenna array 720. In some examples, EBG isolator 722 may be a printed array of resonant patch elements having dimensions selected to provide cancellation of electromagnetic radiation from the frequency modulated continuous wave transmit beam to reduce a magnitude of radiation from transmit array 718 to which receive array 720 is indirectly exposed. In other words, EBG isolator 722 may isolate transmit array 718 from receive array 720. The components of phased-array radar panel 711 may be a single, integrated package.

In some examples, other printed boards (not shown in FIGS. 7A and 7B) may include digital and frequency synthesizer components, including devices, such as field programmable gate arrays (FPGAs) that control scanning and beamforming on receive. Some additional printed circuit boards may include power supply components and additional signal processing components, along with an interface for connecting phased-array radar panel 711 to other FMCW radar arrays and/or components of the aircraft or device on which phased-array radar panel 711 is utilized. In some examples, multiple FMCW radar arrays may be connected to common control electronics, which may control operation of the FMCW radar arrays, including, for example, radar pulse synchronization, scanning frequencies, target tracking, or the like.

The printed circuit boards, transmit array 718, and receive array 720 are physically proximate to each other, e.g., located in a single housing 713. For example, the patch layer, heatsink 714 and the cover may be considered a housing, similar or the same as housing. The printed circuit boards, including the patch layer may include components, such as processing circuitry 120 and memory device 130 in relation to FIG. 1, for an FMCW radar device and located in single housing.

In some examples, a proposed system such as system 100 may include a continuous wave radar device (e.g., weather radar device 110) that transmits one hundred percent of the time at a power level of approximately thirty watts. The radar device may be configured to use a total input power of approximately five hundred and fifty watts for three faces. The top transmit element rows use transmitter parts, while the remaining receive element rows use receive only parts. This configuration may reduce costs by reducing the number of high-cost transmit components.

Figure 8A:
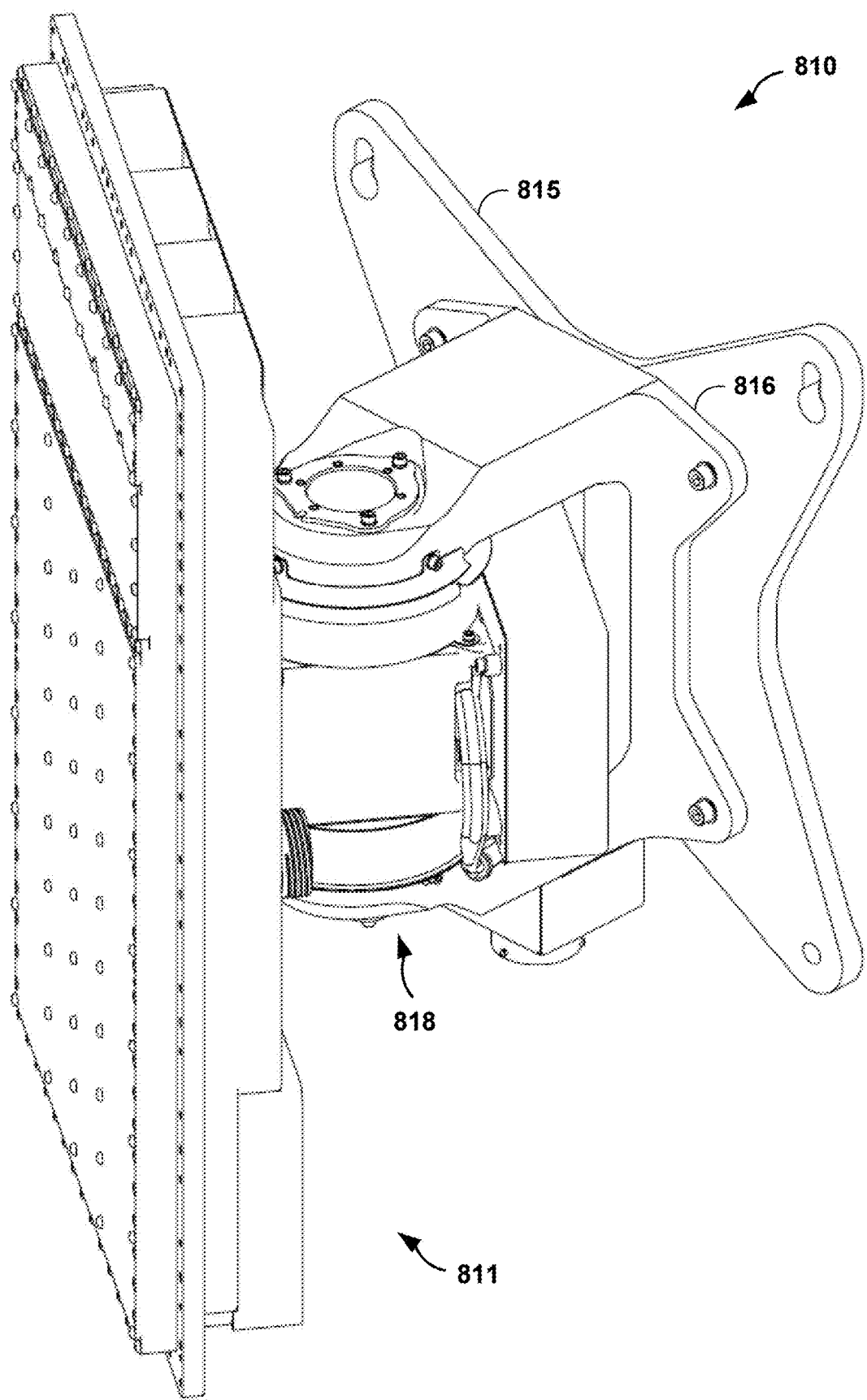
FIGS. 8A and 8B are diagrams of an example FMCW radar device mounted to allow mechanical scanning in azimuth.
Figure 8B:
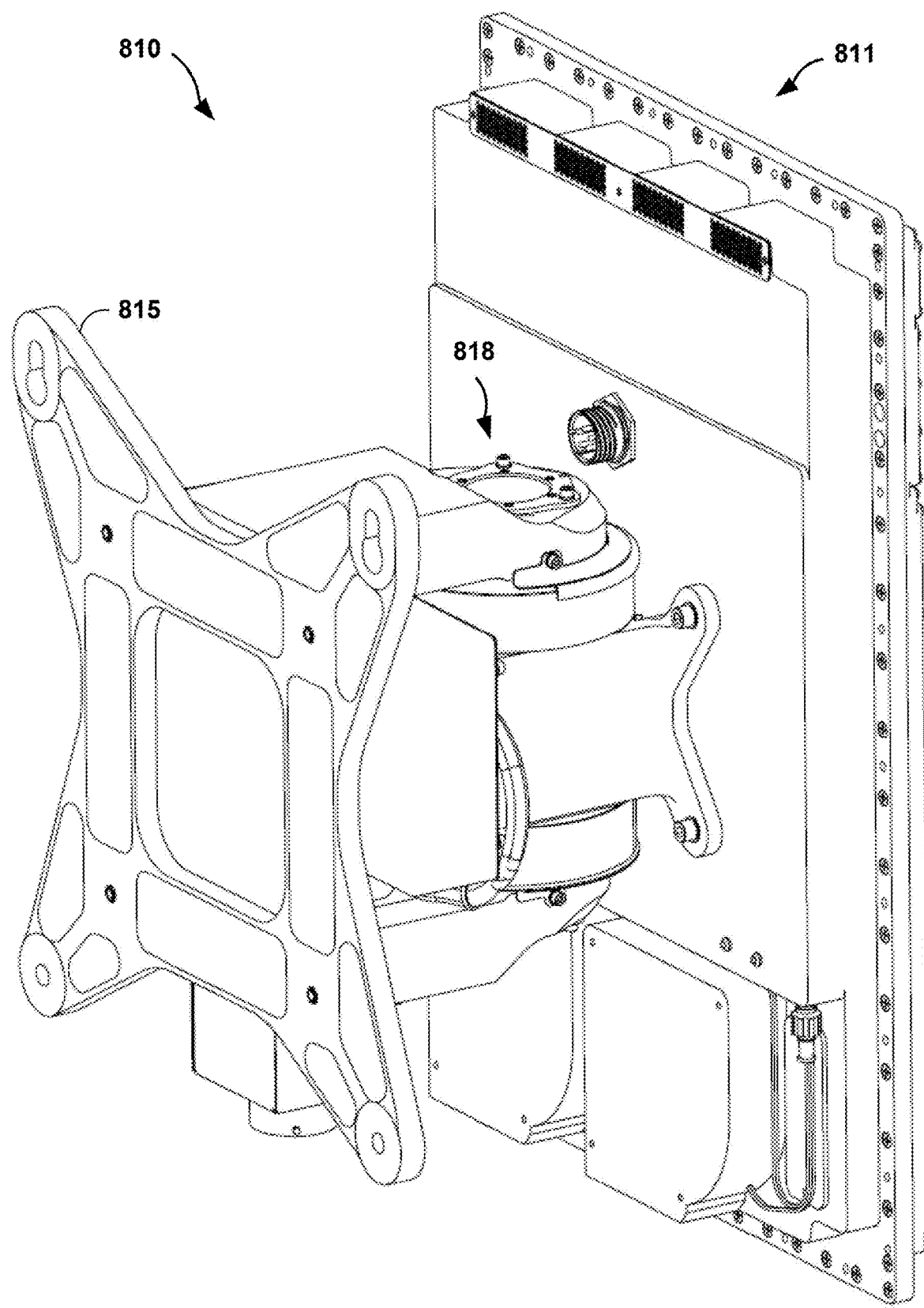

FIGS. 8A and 8B are diagrams of an example FMCW radar device mounted to allow mechanical scanning in azimuth. Gimbaled mount 815 is one example technique for moving and positioning a radar device; a weather radar device of this disclosure may not include a mechanical element for positioning a radar device. Mechanical scanning in azimuth may provide a wider field of regard. Radar apparatus 810 includes integrated radar device 811 (e.g., a phased-array radar panel) supported by gimbaled mount 815. Though radar apparatus 810 may be used in a variety of applications, this disclosure will focus on the application as a weather radar in an aircraft, to simplify and clarify the description.

Integrated radar device 811 of radar apparatus 810 outputs an FMCW transmit beam and may electronically steer the FMCW transmit beam in azimuth, e.g. the horizontal direction with respect to the ground. Integrated radar device 810 may receive a plurality of receive signals reflected from objects or weather within the field of regard of integrated radar device 810. Integrated radar device 810 may digitally generate, using the plurality of receive signals, a plurality of receive beams within the area illuminated by the FMCW transmit beam.

Gimbaled mount 815 may mechanically scan integrated radar device 810 in azimuth, which extends the angular range of coverage for the electronic scan of integrated radar device 810. In some examples, gimbaled mount 815 may receive a position signal and rotate and aim integrated radar device 810 in response to the position signal. In other words, gimbaled mount 815 is configured to mechanically move the integrated radar device to various positions in the azimuth direction. In this manner, radar apparatus 810 may cover a larger field of regard than a single integrated radar device could cover by electronic scanning alone.

FIG. 8A depicts radar apparatus 810, which includes integrated radar device 811 supported by gimbaled mount 815, which performs the same functions as described above. FIG. 8A further depicts mounting portion 816 and rotatable housing 818 of gimbaled mount 815. Mounting portion 816 is one example of a mounting portion of a gimbaled mount 815 that may attach radar apparatus 810 to, for example, within the nose radome of an aircraft or an unmanned aerial vehicle (UAV). Mounting portion 816 may be configured to support radar apparatus 810 during operations where radar apparatus 810 may encounter vibration, acceleration forces, turning forces and similar stresses.

Housing 818 may rotate in relation to mounting portion 816, for example, in response to a position signal that causes gimbaled mount 815 to mechanically rotate integrated radar device 811 to one or more angular positions. Housing 818 may include one or more motors (not shown in FIGS. 8A and 8B) that are configured to rotate integrated radar device 810. The one or more motors may be controlled by electronic circuitry within integrated radar device 810. In other examples, the one or more motors may receive control signals from other circuitry, such as circuitry within a radar display and control unit (not shown in FIGS. 8A and 8B). A radar display and control unit may be mounted in a vehicle, such as the cockpit of an aircraft, and display objects and weather detected by radar apparatus 810.

Housing 818 may also include a coiled cable, the coiled cable comprising a plurality of conductors (not shown in FIGS. 8A and 8B). In some examples, the coiled cable may be configured to electrically connect the integrated radar device to the mounting portion and further to the radar display and control unit. The coiled cable may carry electrical power and signals to and from integrated radar device 811. For example, the coiled cable may carry control signals from the radar display and control unit to change the electronic scan pattern of the FMCW transmit beam. The coiled cables may carry signals to the one or more motors to cause gimbaled mount 815 to rotate integrated radar device 810 in the azimuth direction.

The coiled cable may, in some examples, be referred to as a clock spring cable, because the coiled cable may have a shape similar to a clock spring. Other examples may include a multi-pass box spring cable and a single pass flat ribbon cable. In some examples, housing 818 may include multiple, redundant coiled cables to improve reliability. Housing 818, the motors described above, or other components of radar apparatus 810 may provide position feedback to determine the angular position of integrated radar device 811.

In operation, integrated radar device 811 may be configured to electronically scan the FMCW transmit beam in the azimuth direction when gimbaled mount 815 is mechanically stationary at a predetermined position of a plurality of predetermined positions. In other examples, radar apparatus 810 may be configured to simultaneously mechanically scan/rotate integrated radar device 811 with gimbaled mount 815 while integrated radar device 811 electronically scans the radar transmit beam. Electronically scanning the transmit beam while stationary at a predetermined position may have advantages in simplifying the operation of radar apparatus 810. For example, signal processing circuitry within integrated radar device 811 may be less complex if configured to interpret to angular position of a target from a fixed mechanical position of integrated radar device 811. The signal processing circuitry may also be configured to determine a more precise target location from a fixed mechanical position, when compared to considering both a moving electronic transmit beam and a moving integrated radar device 810.

Radar apparatus 810 of this disclosure may have advantages over other configurations of radar systems that perform similar functions. In addition to the advantages described above, a gimbaled mount that rotates only in the azimuth direction simplifies operation when compared to radar systems that mechanically aim a pencil beam type radar transmit beam in multiple directions. The pencil beam type radar systems may require multiple, high-torque motors to rapidly slew the pencil beam to cover the entire radar field of regard, such as in a complex raster pattern. In contrast, radar apparatus 810 of this disclosure may be configured to use less complex, lower torque motors, such as a brushless DC motor, which may reduce cost of radar apparatus 810 compared to mechanically scanned pencil beam radar systems. The reduced demand on motors in radar apparatus 810 may also improve reliability and mean time between failures (MTBF) when compared to other types of radar systems. Additionally, a single integrated radar device, fewer motors, and a less complex mechanical support system may have the advantage of reduced power consumption, reduced cost, reduce mass and less weight when compared to other existing radar systems.

Figure 9:
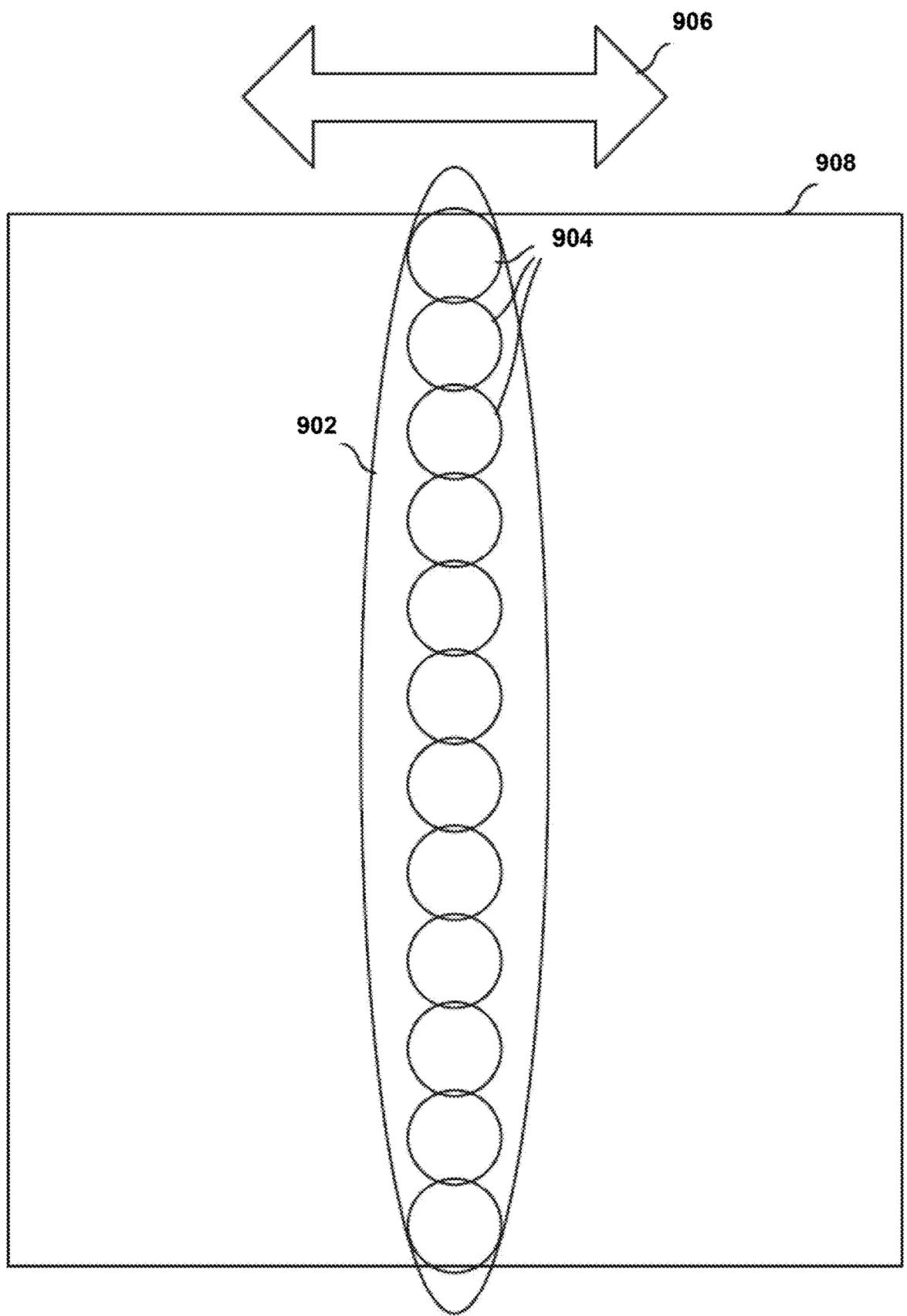
FIG. 9 is a conceptual diagram illustrating an example transmit beam and a plurality of example receive beams, which may be generated using transmit array and receive array.

FIG. 9 is a conceptual diagram illustrating an example transmit beam 902 and a plurality of example receive beams 904, which may be generated using transmit array 618 and receive array 620. Beams 902 and 904 are examples of radar signals 140 and 150 of FIG. 1, where reflected radar signals 150 from particles 160 may fall within one of receive beams 904. Transmit beam 902 is depicted as being approximately elliptical in shape, with a greater extent in elevation than in azimuth. FIG. 9 also depicts a representation of a predetermined area 908 which is to be illuminated by FMCW radar array 612 and phased-array radar panel 711 (FIGS. 6-7B). As shown in FIG. 9, transmit beam 902 may be at least as tall in elevation as the elevation of predetermined area 908, such that transmit beam 902 illuminates the entire elevation of a section of predetermined area 908 without steering or scanning transmit beam 902 in elevation. In other examples, as described above, transmit beam 902 may be wide in azimuth and short in elevation. In general, transmit beam 902 may have a greater extent in a first illumination dimension than in a second illumination dimension substantially perpendicular to the first illumination dimension.

A transmit electronics module associated with transmit array 618 may be configured to scan, or steer, transmit beam 902 in azimuth (e.g., the second illumination dimension), as indicated by arrow 906. In some examples, the transmit electronics module may be configured to apply a phase shift to each transmit antenna element of the plurality of transmit antenna elements 624 (FIG. 6) which changes as a function of time, which results in transmit beam 902 being scanned in azimuth.

A receive electronics module associated with receive array 620 is configured to electronically generate the plurality of receive beams 904. Although twelve receive beams 904 are illustrated in FIG. 9, in other examples, the receive electronics module may be configured to generate more or fewer receive beams 904 using receive array 620. Receive beams 904 are one example of multiple simultaneous receive beams, but receive array 620 may also generate a single receive beam, in some examples. FIG. 9 illustrates receive beams 904 as vertically stacked (i.e., same azimuth angle), but receive beams 904 may be horizontally arrayed or stacked or positioned in arbitrary unstacked directions. For example, the receive electronics module associated with receive array 620 may be configured to generate at least one receive beam 904, but the receive electronics module may be configured to detect the presence of ice crystals based on only one receive beam 904.

In some examples, the receive electronics module associated with receive array 620 is configured to scan, or steer, each of the plurality of receive beams 904 in the second illumination dimension (e.g., azimuth) in parallel with transmit beam 902. For example, the receive electronics module associated with receive array 620 may be configured to scan, or steer, each of the plurality of receive beams 904 in the second illumination dimension (e.g., azimuth) such that the plurality of receive beams 904 are scanned at the same rate and to corresponding locations so that the plurality of receive beams 904 are substantially always (e.g., always or nearly always) located within the area illuminated by transmit beam 902.

In some examples, the receive electronics module associated with receive array 620 may be configured to scan, or steer, the plurality of receive beams in the second illumination dimension (e.g., azimuth) by applying a phase shift to the signals received from each respective receive antenna element of the plurality of receive antenna elements 634. The receive electronics associated with receive array 620 then may process the phase-shifted signals as described below to produce phase-shifted and summed I and Q values for each row of receive antenna elements 634 in each respective quadrant of quadrants 632 (FIG. 6). For example, when each row of receive antenna elements 634 in each respective quadrant of quadrants 632 (FIG. 6) includes twelve elements, the receive electronics module associated with receive array 620 may be configured to generate a single phase-shifted and summed I value and a single phase-shifted and summed Q value for each row of twelve receive antenna elements 634 each time the receive array 620 is sampled.

The receive electronics module associated with receive array 620 also may be configured to generate the plurality of receive beams 904 at predetermined first illumination dimension (e.g., elevation) positions by applying a complex beam weight to the phase-shifted and summed I and Q values for each row of each of quadrants 632 (FIG. 6). The phase-shifted and summed I and Q values determined by the receive electronics module for a single sample instance may be reused multiple times to generate the corresponding number or receive beams 904 at respective elevation positions. For example, to generate twelve receive beams 904, the receive electronics module associated with receive array 620 may apply twelve different complex beam weights to the phase-shifted and summed I and Q values for each row of each of quadrants 632 in twelve separate operations.

The plurality of complex beam weights may correspond to the number of receive beams 904. The values for each of the plurality of complex beam weights may be selected to result in the plurality of receive beams being generated at the respective predetermined elevation positions. As shown in FIG. 9, in some examples, the elevation positions of the plurality of receive beams 904 may be selected to substantially fully cover (e.g., fully cover or nearly fully cover) the elevation extent of the predetermined area 908 which is to be illuminated. In some examples, the adjacent ones of the plurality of receive beams 904 may partially overlap in elevation. In this way, the receive electronics associated with receive array 620 may generate a plurality of receive beams 904 at predetermined first illumination dimension (e.g., elevation) positions and scan, or steer, the plurality of receive beams 904 in the second illumination dimension (e.g., azimuth).

Additionally, because receive array 620 is conceptually (and, optionally, electrically) divided into quadrants 632, the receive electronics module associated with receive array 620 may be configured to generate monopulse tracking beams. This may be used to facilitate tracking of objects by radar system 610. By generating a transmit beam 902 and a plurality of receive beams 904, radar system 610 may perform monopulse tracking for each of receive beams 904, which may facilitate tracking multiple objects within predetermined area 908. For example, by digitally combining the I and Q values for the two left quadrants 632a and 632c together, digitally combining the I and Q values for the two right quadrants 632b and 632d, and determining the difference between I and Q values for the two left quadrants 632a and 632c and the I and Q values for the two right quadrants 632b and 632d, the receive electronics module may create an azimuth monopulse tracking beam. Similarly, in some examples, by digitally combining the I and Q values for the top two quadrants 632a and 632b, and digitally combining the I and Q values for the bottom two quadrants 632c and 632d, and determining the difference between I and Q values for the two top quadrants 632a and 632b and the I and Q values for the two bottom quadrants 632c and 632d, the receive electronics module may create an elevation monopulse tracking beam. In some examples, by digitally combining the I and Q values for respective rows of all 4 quadrants 632, a reference sum beam may be created for comparison to the azimuth and elevation monopulse tracking beams. This may permit an accurate phase comparison monopulse to be created for each of receive beams 904. Additionally, as each of FMCW radar arrays 612 is configured to generate a transmit beam 902 and a plurality of receive beams 904, which are scanned within a corresponding predetermined window, this may facilitate tracking of multiple objects by radar system 610.

In some examples, instead of being associated with a single receive array 620, the receive electronics module may be associated with multiple receive arrays 620. In other examples, a first portion of the receive electronics module may be associated with a single receive array, and a second portion of the receive electronics module may be associated with multiple receive arrays. For example, a portion of the receive electronics module that performs frequency downconversion and analog beam steering using phase shifts may be associated with a single array (e.g., receive array 620 of FIG. 6), and each receive array may include a respective portion that performs frequency downconversion and analog beam steering using phase shifts. Continuing this example, a portion of the receive electronics module applies complex beam weight to the phase-shifted and summed I and Q values for each row of each of quadrants 632 to form the receive beams at predetermined elevation positions and form monopulse tracking beams may be associated with multiple receive arrays. In some examples, then, different portions of the receive electronics module may be conceptually associated with different receive arrays 620 or multiple receive arrays, physically associated with different receive arrays 620, may be physically separate from receive arrays 620, or the like.

The following examples may illustrate one or more of the techniques of this disclosure.

Example 1. A system includes a weather radar device configured to transmit radar signals, receive first reflected radar signals at a first time, and receive second reflected radar signals at a second time. The system also includes processing circuitry configured to determine a first magnitude of reflectivity based on the first reflected radar signals and determine a second magnitude of reflectivity based on the second reflected radar signals. The processing circuitry is also configured to determine a temporal variance in reflectivity magnitudes based on determining a difference in reflectivity between the first magnitude and the second magnitude. The processing circuitry is further configured to determine a presence of ice crystals based on the first magnitude of reflectivity, the second magnitude of reflectivity, and the temporal variance in reflectivity magnitudes.

Example 2. The system of example 1, wherein the processing circuitry is further configured to generate an output indicating the presence of ice crystals in response to determining the presence of ice crystals.

Example 3. The system of examples 1-2 or any combination thereof, wherein the weather radar device is configured to receive reflected radar signals by at least receiving the reflected radar signals for a volume of space. The processing circuitry is configured to determine the presence of ice crystals in the volume of space based on the first magnitude of reflectivity, the second magnitude of reflectivity, and the temporal variance in the reflectivity magnitudes of the reflected radar signals.

Example 4. The system of examples 1-3 or any combination thereof, wherein the processing circuitry is further configured to receive altitude information and static air temperature information. The processing circuitry is configured to determine the presence of ice crystals based on the first magnitude of reflectivity, the second magnitude of reflectivity, the temporal variance in reflectivity magnitudes, the static air temperature information, and the altitude information.

Example 5. The system of examples 1-4 or any combination thereof, wherein the processing circuitry is further configured to cause the weather radar device to perform a full volumetric scan. The processing circuitry is configured to determine the presence of ice crystals based on the first magnitude of reflectivity, the second magnitude of reflectivity, the temporal variance in reflectivity magnitudes, the static air temperature information, the altitude information, and a spatial reflectivity distribution within the full volumetric scan.

Example 6. The system of examples 1-5 or any combination thereof, wherein the processing circuitry is further configured to determine a location of a storm cell based on the reflected radar signals and cause the weather radar device to scan a volume of space downwind from the storm cell.

Example 7. The system of examples 1-6 or any combination thereof, wherein the first time is less than five seconds before or after the second time.

Example 8. The system of examples 1-7 or any combination thereof, wherein the processing circuitry is further configured to classify a first portion of a volume of space as ice crystals, a second portion of the volume of space as liquid, and a third portion of the volume of space as possibly mixed phase areas and scan the first portion of the volume of space classified as ice crystals.

Example 9. The system of examples 1-8 or any combination thereof, wherein the processing circuitry is further configured to cause the weather radar device to dwell in a volume of space, wherein the processing circuitry is configured to determine a likelihood that ice crystals are present in the volume of space based on the first magnitude of reflectivity, the second magnitude of reflectivity, and the temporal variance in reflectivity magnitudes of the reflected radar signals received by the weather radar device from the volume of space while dwelling on the volume of space.

Example 10. A method includes transmitting radar signals, receiving first reflected radar signals at a first time, and receiving second reflected radar signals at a second time. The method also includes determining a first magnitude of reflectivity based on the first reflected radar signals and determining a second magnitude of reflectivity based on the second reflected radar signals. The method further includes determining a temporal variance in reflectivity magnitudes based on determining a difference in reflectivity between the first magnitude and the second magnitude. The method includes determining a presence of ice crystals based on the first magnitude of reflectivity, the second magnitude of reflectivity, and the temporal variance in reflectivity magnitudes.

Example 11. The method of example 10, further including generating an output indicating the presence of ice crystals in response to determining the presence of ice crystals.

Example 12. The method of examples 10-11 or any combination thereof, wherein receiving reflected radar signals includes receiving the reflected radar signals for a volume of space. Determining the presence of ice crystals includes determining the presence of ice crystals in the volume of space based on the first magnitude of reflectivity, the second magnitude of reflectivity, and the temporal variance in the reflectivity magnitudes of the reflected radar signals.

Example 13. The method of examples 10-12 or any combination thereof, further including receiving altitude information and static air temperature information, wherein determining the presence of ice crystals is further based on the first magnitude of reflectivity, the second magnitude of reflectivity, the temporal variance in reflectivity magnitudes, the static air temperature information, and the altitude information.

Example 14. The method of examples 10-13 or any combination thereof, further including performing a full volumetric scan, wherein determining the presence of ice crystals is further based on a spatial reflectivity distribution within the full volumetric scan.

Example 15. The method of examples 10-14 or any combination thereof, further including determining a location of a storm cell based on the reflected radar signals and scanning a volume of space downwind from the storm cell.

Example 16. The method of examples 10-15 or any combination thereof, further including classifying a first portion of a volume of space as ice crystals, a second portion of the volume of space as liquid, and a third portion of the volume of space as possibly mixed phase areas. The method also includes scanning the first portion of the volume of space classified as ice crystals.

Example 17. A device includes a computer-readable medium having executable instructions stored thereon, configured to be executable by one or more processors for causing the one or more processors to cause a weather radar device to transmit radar signals, receive first reflected radar signals at a first time, and receive second reflected radar signals at a second time. The executable instructions further cause the one or more processors to determine a first magnitude of reflectivity based on the first reflected radar signals and determine a second magnitude of reflectivity based on the second reflected radar signals. The executable instructions also cause the one or more processors to determine a temporal variance in reflectivity magnitudes based on determining a difference in reflectivity between the first magnitude and the second magnitude. The executable instructions cause the one or more processors to determine a presence of ice crystals based on the first magnitude of reflectivity, the second magnitude of reflectivity, and the temporal variance in reflectivity magnitudes.

Example 18. The device of example 17, wherein the executable instructions further cause the one or more processors to cause the weather radar device to receive reflected radar signals by at least receiving the reflected radar signals for a volume of space. The executable instructions also cause the one or more processors to determine the presence of ice crystals in the volume of space based on the first magnitude of reflectivity, the second magnitude of reflectivity, and the temporal variance in the reflectivity magnitudes of the reflected radar signals.

Example 19. The device of examples 17-18 or any combination thereof, wherein the executable instructions further cause the one or more processors to receive altitude information and static air temperature information, cause the weather radar device to perform a full volumetric scan, and determine the presence of ice crystals based on the first magnitude of reflectivity, the second magnitude of reflectivity, the temporal variance in reflectivity magnitudes, the static air temperature information, the altitude information, and a spatial reflectivity distribution within the full volumetric scan.

Example 20. The device of examples 17-19 or any combination thereof, wherein the executable instructions further cause the one or more processors to classify a first portion of a volume of space as ice crystals, a second portion of the volume of space as liquid, and a third portion of the volume of space as possibly mixed phase areas. The executable instructions further cause the one or more processors to cause the weather radar device to scan the first portion of the volume of space classified as ice crystals.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

System 100 may include one or more memory devices, such as memory device 130, that include any volatile or non-volatile media, such as a RAM, ROM, non-volatile RAM (NVRAM), electrically erasable programmable ROM (EEPROM), flash memory, and the like. The one or more memory devices may store computer-readable instructions that, when executed by processing circuitry, cause the processing circuitry to implement the techniques attributed herein to processing circuitry.

Elements of processing circuitry 120 and/or weather radar device 110 may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of processing circuitry 120 and/or weather radar device 110 as in any of the examples herein may be implemented as a device, a system, an apparatus, and may embody or implement a method of determining the presence of ice crystals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or unmanned craft (e.g., a UAV, flying robot, or automated cargo or parcel delivery drone or other craft).

Various illustrative aspects of the disclosure are described above. These and other aspects are within the scope of the following claims.

What is claimed is:

1. A system comprising:
a weather radar device configured to:
transmit a first pulse comprising radar signals;
receive a reflection of the first pulse at a first time;
transmit a second pulse comprising radar signals after transmitting the first pulse; and
receive a reflection of the second pulse at a second time; and
processing circuitry configured to:
determine a first magnitude of reflectivity based on the reflection of the first pulse;
determine a second magnitude of reflectivity based on the reflection of the second pulse;
determine a temporal variance in reflectivity magnitudes based on determining a difference in reflectivity between the first magnitude and the second magnitude; and
determine a presence of ice crystals based on the first magnitude of reflectivity, the second magnitude of reflectivity, and the temporal variance in reflectivity magnitudes.

2. The system of claim 1, wherein the processing circuitry is further configured to generate an output indicating the presence of ice crystals in response to determining the presence of ice crystals.

3. The system of claim 1, wherein the processing circuitry is configured to:
determine a standard deviation of magnitudes of reflectivity for reflections of a plurality of pulses, wherein the plurality of pulses comprises the first and second pulses; and
determine the temporal variance based on the standard deviation of the magnitudes of reflectivity for the reflections of the plurality of pulses.

4. The system of claim 1,
wherein the first magnitude of reflectivity comprises a magnitude of reflectivity for a voxel at the first time,
wherein the second magnitude of reflectivity comprises a magnitude of reflectivity for the voxel at the second time, and
wherein the processing circuitry is configured to determine the presence of ice crystals in a volume of space corresponding to the voxel based on the first magnitude of reflectivity, the second magnitude of reflectivity, and the temporal variance in the reflectivity magnitudes of the reflections of the first and second pulses.

5. The system of claim 1, wherein the processing circuitry is further configured to:
receive turbulence information; and
determine the presence of ice crystals based on the first magnitude of reflectivity, the second magnitude of reflectivity, the temporal variance in reflectivity magnitudes, and the turbulence information.

6. The system of claim 4, wherein the processing circuitry is further configured to:
cause the weather radar device to perform a full volumetric scan; and
determine the presence of ice crystals based on the first magnitude of reflectivity, the second magnitude of reflectivity, the temporal variance in reflectivity magnitudes, the turbulence information, and a spatial reflectivity distribution within the full volumetric scan.

7. The system of claim 1, wherein the processing circuitry is further configured to:
determine a location of a storm cell based on the reflections of the first and second pulses; and
scan a volume of space downwind from the storm cell.

8. The system of claim 1, wherein the first time is less than five seconds before or after the second time.

9. The system of claim 1, wherein the processing circuitry is further configured to:
classify a first portion of a volume of space as ice crystals, a second portion of the volume of space as liquid, and a third portion of the volume of space as possibly mixed phase areas; and
cause the weather radar device to scan the first portion of the volume of space classified as ice crystals.

10. The system of claim 1, wherein the processing circuitry is further configured to:
cause the weather radar device to dwell in a volume of space; and
determine a likelihood that ice crystals are present in the volume of space based on the first magnitude of reflectivity, the second magnitude of reflectivity, and the temporal variance in reflectivity magnitudes of the reflections of the first and second pulses received by the weather radar device from the volume of space while dwelling on the volume of space.

11. A method comprising:
transmitting a first pulse comprising radar signals;
receiving a reflection of the first pulse at a first time;
transmitting a second pulse comprising radar signals after transmitting the first pulse;
receiving a reflection of the second pulse at a second time;
determining a first magnitude of reflectivity based on the reflection of the first pulse;
determining a second magnitude of reflectivity based on the reflection of the second pulse;
determining a temporal variance in reflectivity magnitudes based on determining a difference in reflectivity between the first magnitude and the second magnitude; and
determining a presence of ice crystals based on the first magnitude of reflectivity, the second magnitude of reflectivity, and the temporal variance in reflectivity magnitudes.

12. The method of claim 11, further comprising generating an output indicating the presence of ice crystals in response to determining the presence of ice crystals.

13. The method of claim 11, further comprising:
determining a standard deviation of magnitudes of reflectivity for reflections of a plurality of pulses, wherein the plurality of pulses comprises the first and second pulses; and
determining the temporal variance based on the standard deviation of the magnitudes of reflectivity for the reflections of the plurality of pulses.

14. The method of claim 11,
wherein the first magnitude of reflectivity comprises a magnitude of reflectivity for a voxel at the first time,
wherein the second magnitude of reflectivity comprises a magnitude of reflectivity for the voxel at the second time, and
wherein determining the presence of ice crystals comprises determining the presence of ice crystals in a volume of space corresponding to the voxel based on the first magnitude of reflectivity, the second magnitude of reflectivity, and the temporal variance in the reflectivity magnitudes of the reflections of the first and second pulses.

15. The method of claim 11, further comprising receiving turbulence information, wherein determining the presence of ice crystals is further based on the first magnitude of reflectivity, the second magnitude of reflectivity, the temporal variance in reflectivity magnitudes, and the turbulence information.

16. The method of claim 11, further comprising:
determining a location of a storm cell based on the reflections of the first and second pulses; and
scanning a volume of space downwind from the storm cell.

17. The method of claim 11, further comprising:
classifying a first portion of a volume of space as ice crystals, a second portion of the volume of space as liquid, and a third portion of the volume of space as possibly mixed phase areas; and
scanning the first portion of the volume of space classified as ice crystals.

18. A device comprising a computer-readable medium having executable instructions stored thereon, configured to be executable by one or more processors for causing the one or more processors to:
cause a weather radar device to:
transmit a first pulse comprising radar signals;
receive a reflection of the first pulse at a first time;
transmit a second pulse comprising radar signals after transmitting the first pulse; and
receive a reflection of the second pulse at a second time;
determine a first magnitude of reflectivity based on the reflection of the first pulse;
determine a second magnitude of reflectivity based on the reflection of the second pulse;
determine a temporal variance in reflectivity magnitudes based on determining a difference in reflectivity between the first magnitude and the second magnitude; and
determine a presence of ice crystals based on the first magnitude of reflectivity, the second magnitude of reflectivity, and the temporal variance in reflectivity magnitudes.

19. The device of claim 18,
wherein the executable instructions further cause the one or more processors to determine a standard deviation of magnitudes of reflectivity for reflections of a plurality of pulses, wherein the plurality of pulses comprises the first and second pulses; and
wherein the instructions to determine the temporal variance comprise instructions to determine the temporal variance based on the standard deviation of the magnitudes of reflectivity for the reflections of the plurality of pulses.

20. The device of claim 18, wherein the executable instructions further cause the one or more processors to:
receive turbulence information; and
determine the presence of ice crystals based on the first magnitude of reflectivity, the second magnitude of reflectivity, the temporal variance in reflectivity magnitudes, and the turbulence information.

* * * * *